US012666309B2

(12) United States Patent
Wang et al.

(10) Patent No.: US 12,666,309 B2
(45) Date of Patent: Jun. 23, 2026

(54) METHOD AND APPARATUS FOR PREDICTIVE RESOURCE ALLOCATION IN UNLICENSED BAND

(71) Applicant: Samsung Electronics Co., Ltd., Suwon-si (KR)

(72) Inventors: Shoufeng Wang, Beijing (CN); Junyi Yu, Beijing (CN); Nan Cao, Beijing (CN); Wenjing Zhou, Beijing (CN); Jiankang Wang, Beijing (CN); Xiaohui Yang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 407 days.

(21) Appl. No.: 18/185,043

(22) Filed: Mar. 16, 2023

(65) Prior Publication Data

US 2023/0362730 A1 Nov. 9, 2023

Related U.S. Application Data

(63) Continuation of application No. PCT/KR2023/002555, filed on Feb. 22, 2023.

(30) Foreign Application Priority Data

May 9, 2022 (CN) .......................... 202210497575.3
Oct. 27, 2022 (CN) .......................... 202211328228.4

(51) Int. Cl.
*H04W 28/08* (2023.01)
*H04W 72/50* (2023.01)
*H04W 74/0816* (2024.01)
(52) U.S. Cl.
CPC ..... *H04W 28/0942* (2020.05); *H04W 72/535* (2023.01); *H04W 74/0816* (2013.01)

(58) Field of Classification Search
CPC ........... H04W 28/0942; H04W 72/535; H04W 74/0816
See application file for complete search history.

(56) References Cited

U.S. PATENT DOCUMENTS 11,039,474 B2 6/2021 Cui et al.
11,412,553 B2 * 8/2022 Kim .................. H04W 74/0875
(Continued)

FOREIGN PATENT DOCUMENTS

EP 3 989 626 A1 4/2022
WO 2018/093939 A1 5/2018
(Continued)

OTHER PUBLICATIONS

International Search Report dated May 24, 2023, issued in International Application No. PCT/KR2023/002555.

*Primary Examiner* — Chandrahas B Patel
(74) *Attorney, Agent, or Firm* — Jefferson IP Law, LLP

(57) ABSTRACT

A network node and a method performed by the network node are provided. According to an embodiment, a method performed by a network node is provided. The method comprises obtaining prediction information on an availability of an unlicensed band based on historical data of the unlicensed band. The method comprises selecting transmission resources of the unlicensed band based on the prediction information. The method comprises determining a number of data packets capable of being allocated to the transmission resources based on the prediction information. The method comprises transmitting the data packets on the transmission resources according to the determined number of data packets capable of being allocated to the transmission resources.

17 Claims, 20 Drawing Sheets

(56) References Cited

U.S. PATENT DOCUMENTS

| | | | |
|---|---|---|---|
| 11,445,543 B2 * | 9/2022 | Park | .................. H04W 74/0808 |
| 11,510,247 B2 | 11/2022 | Agardh et al. | |
| 11,696,334 B2 * | 7/2023 | Einhaus | .............. H04L 27/0006 |
| | | | 370/329 |
| 11,985,703 B2 | 5/2024 | Zhou | |
| 2016/0302196 A1 | 10/2016 | Chen et al. | |
| 2018/0176890 A1 | 6/2018 | Moon et al. | |
| 2019/0166641 A1 | 5/2019 | Kim et al. | |
| 2019/0380143 A1 | 12/2019 | Zhang et al. | |
| 2020/0068625 A1 | 2/2020 | Zhang et al. | |
| 2020/0186430 A1 | 6/2020 | Halepovic et al. | |
| 2020/0221309 A1 | 7/2020 | Ozturk et al. | |
| 2021/0352724 A1 | 11/2021 | Park | |
| 2022/0038913 A1 | 2/2022 | Sun et al. | |
| 2022/0132554 A1 | 4/2022 | Sayenko et al. | |
| 2022/0150979 A1 | 5/2022 | Noh et al. | |
| 2025/0081232 A1 * | 3/2025 | Bhamri | ............. H04W 74/0808 |

FOREIGN PATENT DOCUMENTS

| | | | |
|---|---|---|---|
| WO | 2019/236985 A1 | 12/2019 | |
| WO | 2020/034431 A1 | 2/2020 | |
| WO | 2020/040933 A1 | 2/2020 | |
| WO | 2020/092357 A1 | 5/2020 | |
| WO | 2020/125121 A1 | 6/2020 | |
| WO | 2020/161332 A1 | 8/2020 | |
| WO | 2020/245403 A1 | 12/2020 | |

* cited by examiner

[Generating a set by moving a window]
Defining the window size equal to $W_{LBT}$ E. g., WLBT = 10. Here, 1 denotes pass (available), 0 denotes failed (unavailable)

111010000 (training input, x) → 0 (training output, y)

110100000 (training input, x) → 1 (training output, y)

C1: UE quantity, $X_{sta}$

C2: traffic load [%]

Sub-band 1

Sub-band 2

Sub-band 3

Sub-band 4

□ LBT Hidden terminal

▨ LBT Detectable terminal

30% Traffic load is set
in each of sub-bands

1910

1920

1930

2010

2020

2030

2040

METHOD AND APPARATUS FOR PREDICTIVE RESOURCE ALLOCATION IN UNLICENSED BAND

CROSS-REFERENCE TO RELATED APPLICATION(S)

This application is a continuation application, claiming priority under § 365(c), of an International application No. PCT/KR2023/002555, filed on Feb. 22, 2023, which is based on and claims the benefit of a Chinese patent application number 202210497575.3, filed on May 9, 2022, in the Chinese Patent Office, and of a Chinese patent application number 202211328228.4, filed on Oct. 27, 2022, in the Chinese Patent Office, the disclosure of each of which is incorporated by reference herein in its entirety.

TECHNICAL FIELD

The disclosure relates to the field of communication. More particularly, the disclosure relates to a network node and a method performed by the network node.

BACKGROUND

The design of a mobile communication system is oriented to the scenario of licensed frequency spectrum communication. The licensed frequency spectrum may ensure that only users of the mobile communication system use the licensed frequency spectrum within the wireless environment used by the mobile communication system, and effectively prevent wireless signal interference generated by communication from other systems. However, licensed frequency spectrum generally requires the purchase of licenses. In the mobile communication system, unlicensed bands may be used to provide additional frequency spectrum for the mobile communication network working in the licensed band (e.g., by the 4th Generation (4G) system Licensed Assisted Access (LAA) technology, the 5th Generation (5G) system New Radio in Unlicensed band (5G NR-U) technology), thereby improving the speed of data transmission and reducing delay.

However, in the prior art such as NR-U/LAA, and the like, that use the unlicensed frequency spectrum, there is a situation where the allocation mechanism for data packets of carriers on the unlicensed band cannot match the available state of the unlicensed band.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a network node and a method performed by the network node.

Additional aspects will be set forth in part in the description which follows and, in part, will be apparent from the description, or may be learned by practice of the presented embodiments.

According to an embodiment, a method performed by a network node is provided. The method comprises obtaining prediction information on an availability of an unlicensed band based on historical data of the unlicensed band. The method comprises selecting transmission resources of the unlicensed band based on the prediction information. The method comprises determining a number of data packets capable of being allocated to the transmission resources based on the prediction information. The method comprises transmitting the data packets on the transmission resources according to the determined number of data packets capable of being allocated to the transmission resources.

According to an embodiment, a network node is provided. The network node comprises at least one processor, and at least one memory for storing computer executable instructions. The computer executable instructions, when executed by the at least one processor, cause the at least one processor to perform a method comprising obtaining prediction information on an availability of an unlicensed band based on historical data of the unlicensed band, selecting transmission resources of the unlicensed band based on the prediction information, determining a number of data packets capable of being allocated to the transmission resources based on the prediction information, and transmitting the data packets on the transmission resources according to the determined number of data packets capable of being allocated to the transmission resources.

According to an embodiment, a computer readable storage medium storing computer program instructions thereon is provided. The computer program instructions, when executed by a processor, cause the processor to implement a method comprising obtaining prediction information on an availability of an unlicensed band based on historical data of the unlicensed band, selecting transmission resources of the unlicensed band based on the prediction information, determining a number of data packets capable of being allocated to the transmission resources based on the prediction information, and transmitting the data packets on the transmission resources according to the determined number of data packets capable of being allocated to the transmission resources.

According to an embodiment, a method performed by a network node is provided. The method includes, when a transmission request of data packets is received, predicting availability of an unlicensed band based on historical data of the unlicensed band and selecting transmission resources based on the prediction result, to transmit the data packets.

For example, the predicting of the availability of the unlicensed band may comprise obtaining, based on the historical data of the unlicensed band, a probability of the unlicensed band being unavailable as the prediction result, by using a classification model.

For example, the transmitting of the data packets may comprise determining a number of the data packets capable of being allocated to the unlicensed band, based on the prediction result, and transmitting the data packets by using the unlicensed band according to the determined number.

For example, the prediction result may be the probability of the unlicensed band being unavailable, the determining of the number of the data packets capable of being allocated to the unlicensed band, based on the prediction result may comprise determining, based on a preset mapping relationship between the probability of the unlicensed band being unavailable and a success transmission probability (STP), the STP value of the unlicensed band, and determining the number of data packets capable of being allocated to the unlicensed band, based on the STP value.

For example, the determining of the number of the data packets capable of being allocated to the unlicensed band, based on the STP value may comprise at least one of when the STP value is not greater than a first threshold value, determining the number of data packets capable of being allocated to the unlicensed band to be a first number, when the STP value is not less than the first threshold value and not greater than a second threshold value, determining the number of packets capable of being allocated to the unlicensed band to be a second number based on the STP value, and when the STP value is not less than the second threshold value, determining the number of data packets capable of being allocated to the unlicensed band to be a third number, wherein the second number is positively correlated to the STP value, and the third number is a packet request number determined based on transmission capacity of a licensed band.

For example, the determining of the STP value of the unlicensed band may comprise determining a first STP value based on the preset mapping relationship between the probability of the unlicensed band being unavailable and the STP, and modifying the first STP value based on a first available resource factor of the unlicensed band, to obtain a second STP value as the STP value of the unlicensed band, wherein the first available resource factor may be related to the number of users that transmit data on the unlicensed band.

For example, the historical data of the unlicensed band may include historical availability data of the unlicensed band, and the historical availability data may include detection results of Listen Before Talk (LBT) detection on the unlicensed band.

For example, the historical data of the unlicensed band may include the historical availability data of the unlicensed band and historical feedback data of hybrid automatic retransmission quest (HARQ) for the unlicensed band, wherein the predicting of the availability of the unlicensed band may include modifying the historical availability data of the unlicensed band by using the historical feedback data, and predicting the availability of the unlicensed band based on the modified historical availability data.

For example, the modifying of the historical availability data of the unlicensed band by using the historical feedback data may comprise if historical feedback data for a specific time among the historical feedback data is Negative Acknowledgement (NACK), modifying historical availability data of the unlicensed band for the specific time.

For example, the modifying of the historical availability data of the unlicensed band by using the historical feedback data may comprise if the network node is in a discontinuous transmission (DTX) mode at a specific time, modifying historical availability data of the unlicensed band for the specific time, if the network node is not in the discontinuous transmission (DTX) mode at the specific time, and if historical feedback data for the specific time among the historical feedback data is Negative Acknowledgement (NACK), modifying historical availability data of the unlicensed band for the specific time.

For example, the historical data of the unlicensed band may include historical success transmission probability (STP) value for the unlicensed band, the method may further comprise determining whether the historical STP value for the unlicensed band exceeds a first preset threshold, if the historical STP value for the unlicensed band exceeds the first preset threshold, performing the predicting of the availability of the unlicensed band based on the historical data of the unlicensed band.

For example, the historical STP value included in the historical data of the unlicensed band may include a mean value of historical STP values within a set time length before a current time.

For example, the transmission request of the data packets may include a retransmission request of the data packets, the transmitting of the data packets may comprise determining whether to retransmit the data packets on the unlicensed band based on the prediction result.

For example, the determining of whether to retransmit the data packets on the unlicensed band based on the prediction result may comprise determining the STP value of the unlicensed band, based on the preset mapping relationship between the probability of the unlicensed band being unavailable and the success transmission probability (STP), and determining whether to retransmit the data packets on the unlicensed band based on the STP value.

For example, the determining of whether to retransmit the data packets on the unlicensed band based on the STP value may comprise when the STP value is greater than a second preset threshold for the unlicensed band, determining to retransmit the data packets on the unlicensed band.

For example, the determining of whether to retransmit the data packets on the unlicensed band based on the STP value may comprise determining the number C1 of users using the unlicensed band and/or a traffic load C2 of the unlicensed band based on probability of the unlicensed band being historically unavailable and the prediction result, determining whether to retransmit the data packets on the unlicensed band based on the C1 and/or C2 values, and the STP value.

For example, the determining of the number C1 of the users using the unlicensed band and/or the traffic load C2 of the unlicensed band may comprise determining candidate combinations of the number of the users using the unlicensed band and the traffic load of the unlicensed band based on the probability of the unlicensed band being historically unavailable and the prediction result, selecting a candidate combination with a minimum variance of the number of the users from among the candidate combinations, and obtaining the C1 and/or C2 based on the selected candidate combination.

For example, the determining of whether to retransmit the data packets on the unlicensed band based on the C1 and/or C2 values, and the STP value may comprise when a preset condition is met, determining to retransmit the data packets on the unlicensed band, wherein the preset condition may include that the STP value is not less than a third preset threshold for the unlicensed band and the C1 value is not greater than a fourth preset threshold for the unlicensed band, or the STP value is not less than the third preset threshold for the unlicensed band and the C2 value is not greater than a fifth preset threshold for the unlicensed band, or the STP value is not less than the third preset threshold for the unlicensed band, the C1 value is not greater than the fourth preset threshold for the unlicensed band, and the C2 value is not greater than the fifth preset threshold for the unlicensed band.

For example, when the preset condition is met, the determining of retransmitting the data packets on the unlicensed band may comprise when all unlicensed bands including the unlicensed band do not meet the preset condition, determining to retransmit the data packets on a licensed band.

For example, when the preset condition is met, the determining of retransmitting the data packets on the unlicensed band may comprise when there are at least two unlicensed bands meeting the preset condition, determining to retransmit the data packets on at least one of the at least two unlicensed bands based on the number of the data packets.

For example, the determining of retransmitting the data packets on the at least one of the at least two unlicensed bands based on the number of the data packets may comprise when the number of the data packets is not greater than a predetermined number, selecting an unlicensed band to retransmit the data packets from among the at least two unlicensed bands, based on at least one of the STP, C1 and C2 values of the at least two unlicensed bands.

For example, the determining of retransmitting the data packets on the at least one of the at least two unlicensed bands based on the number of the data packets may comprise when the number of the data packets is not less than a predetermined number, determining the number of data packets capable of being allocated to the at least two unlicensed bands based on the STP values of the at least two unlicensed bands, and retransmitting the data packets by using the at least two unlicensed bands according to the determined number respectively.

For example, the determining of the STP value of the unlicensed band may comprise determining a third STP value based on the preset mapping relationship between the probability of the unlicensed band being unavailable and the STP, and modifying the third STP value based on a second available resource factor of the unlicensed band, to obtain a fourth STP value as the STP value of the unlicensed band, wherein the second available resource factor may be related to the number of users retransmitting on the unlicensed band and/or the number of users initially transmitting on the unlicensed band.

For example, the unlicensed band may include at least one of a carrier level band and a sub-band level band.

For example, the at least one sub-band level band is obtained by dividing a specific unlicensed band into a plurality of carrier level bands.

For example, the carrier level band is obtained by dividing a specific unlicensed band into a plurality of carrier level bands.

For example, the historical STP value is another statistical value or a last STP value.

According to an embodiment, a network node is provided. The network node includes at least one processor and at least one memory for storing computer executable instructions, wherein the computer executable instructions, when executed by the at least one processor, cause the at least one processor to perform the method performed by the network node.

According to an embodiment, a computer readable storage medium storing computer program instructions thereon is provided, wherein the computer program instructions, when executed by a processor, cause the processor to implement the method performed by the network node.

According to the various embodiments of the disclosure, the risk of transmission failure of data packets is reduced, the efficiency of data transmission is improved, the delay is shortened, and the retransmission efficiency of traffic data is improved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
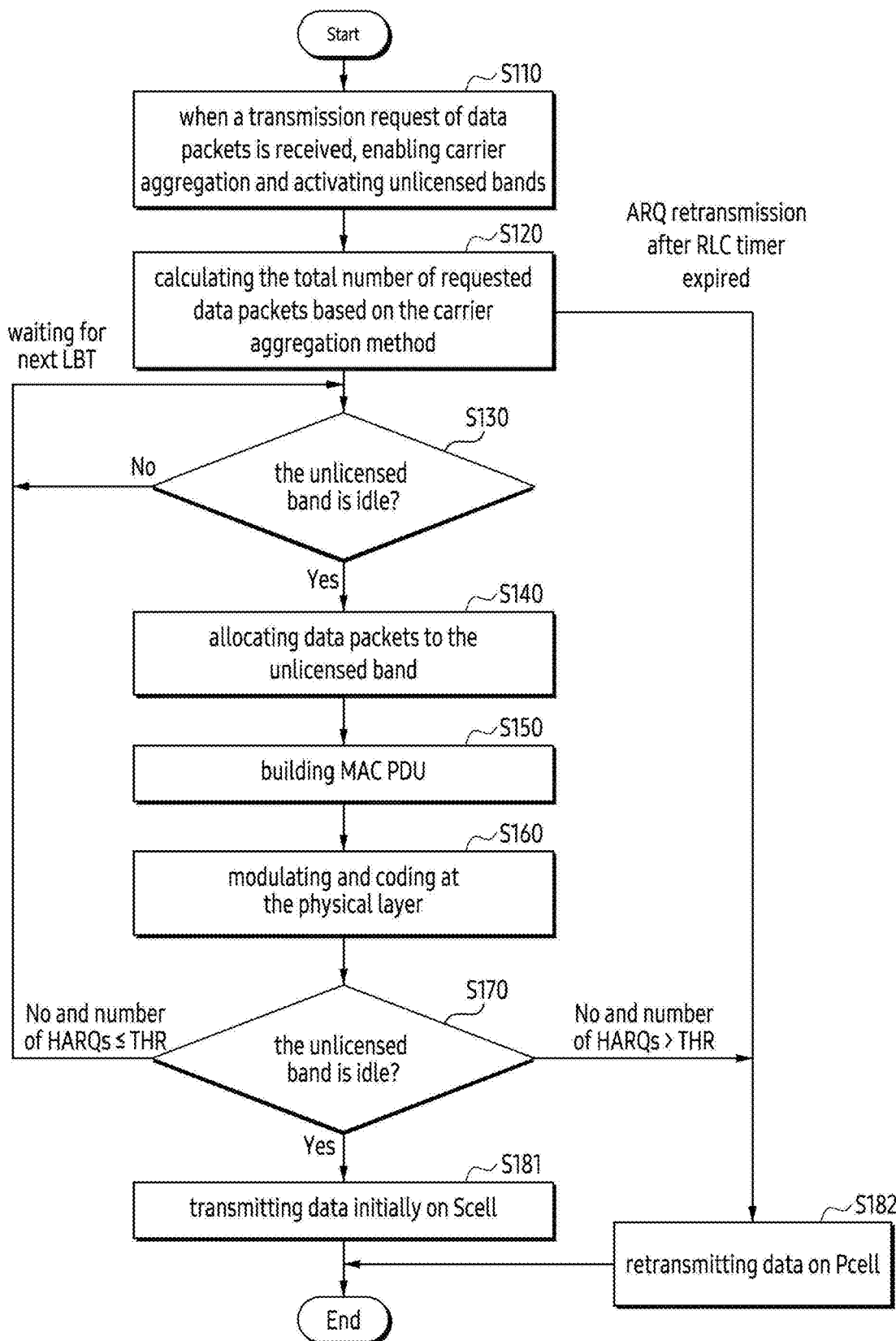
FIG. 1 is a flowchart illustrating an embodiment of allocating data packets to unlicensed bands according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be further understood that terms "include" and "contain" used in the embodiments of the application means that the corresponding features may be implemented as the presented features, information, data, steps, operations, elements and/or components, but it does not exclude that they are implemented as other features, information, data, steps, operations, elements, components and/or combination thereof supported by the technical field. It should be understood that when we say that an element is "connected" or "coupled" to another element, the element may be directly connected or coupled to the other element, or the connection relationship between the element and the other element may be established via an intermediate element. In addition, the "connected" or "coupled" used herein may include wireless connection or wireless coupling. The term "and/or" used herein indicates at least one of items defined by the term, for example, "A and/or B" may be implemented as "A", or as "B", or as "A and B". When describing multiple (two or more) items, if the relationship between the multiple items is not clearly defined, these multiple items may refer to one, more or all of the multiple items. For example, for the description of "parameter A includes A1, A2, A3", it may be implemented that parameter A includes A1, A2 or A3, or it may also be implemented that parameter A includes at least two of the three items A1, A2, A3.

In the prior art such as NR-U/LAA and the like that uses unlicensed frequency spectrum, there is a situation where the allocation mechanism for data packets of carriers on the unlicensed band cannot match the available state of the unlicensed band. When the traffic data packets are transmitted initially or retransmitted, it is difficult to ensure the probability of success transmission with unlicensed band carriers in the prior art, thereby resulting in the problem of low transmission efficiency of traffic data. The main reason for the above problem lies in that nodes using unlicensed bands do not consider the important impact of the availability of frequency bands.

FIG. 1 is a flowchart illustrating an embodiment of allocating data packets to unlicensed bands according to an embodiment of the disclosure. Hereinafter, the operations are described as being performed by the base station, but the disclosure does not exclude that they are performed by the DU of the base station or the RU of the base station.

Referring to FIG. 1, at operation S110, the base station, when receiving a transmission request of data packets, may enable carrier aggregation and activate unlicensed bands. For example, when the base station determines that the amount of data requested by the User Equipment (UE) is large enough, the base station enables carrier aggregation and activate the unlicensed bands. At operation S120, the base station may calculate the total number of requested data packets based on the carrier aggregation method. At operation S130, the base station may determine whether the unlicensed band is idle or not. That is, the base station may perform listen before talk (LBT) detection on an unlicensed band, that is, to determine whether the unlicensed band is occupied or busy. When the LBT detection on the unlicensed band passes (e.g., the unlicensed band is not occupied) ("Yes" at operation S130), the base station may allocate the calculated number of data packets to the unlicensed band at operation S140. When the LBT detection on the unlicensed band does not pass (the detection fails, for example, the unlicensed band is occupied) ("No" at operation S130), the base station may wait for a next LBT detection on the unlicensed band. At operation S150, the base station may build Medium Access Control (MAC) Protocol Data Unit (PDU). At operation S160, the base station may perform modulation and coding at the physical layer. At operation S170, the base station may determine whether the unlicensed band is idle or not. the base station may perform LBT detection again before New Radio (NR) transmission. When the LBT detection performed again passes ("Yes" at operation S170), at operation S181, the base station may transmit data initially on a secondary cell (Scell), that is, transmit data initially on the unlicensed band. When the LBT detection performed again does not pass ("No" at operation S170) and the number of Hybrid Automatic Retransmission Quest Transmissions (HARQ ReTX) counted by the base station from the UE is less than or equal to a predetermined threshold number (THR), the base station may wait for a next LBT detection on the unlicensed band (return to operation S130). When the LBT detection performed again does not pass ("No" at operation S170) and the number of HARQ ReTXs is greater than the predetermined threshold number (THR), or after the Radio Link Control (RLC) timer expires, at operation S182, the base station may retransmit data on a primary cell (Pcell), that is, retransmit data on a licensed band.

Figure 2:
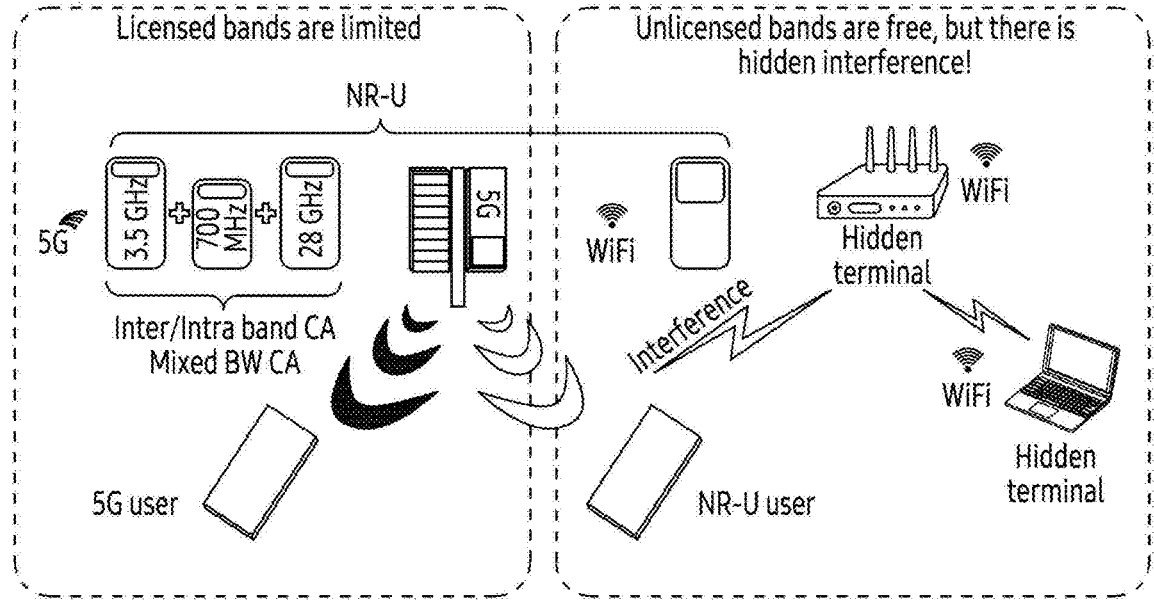
FIG. 2 illustrates an example that failure of LBT detection caused by Wireless Fidelity (WiFi) system using unlicensed bands for communication to an embodiment of the disclosure.

FIG. 2 illustrates an example that failure of LBT detection caused by WiFi system using unlicensed bands for communication according to an embodiment of the disclosure.

Figure 3:
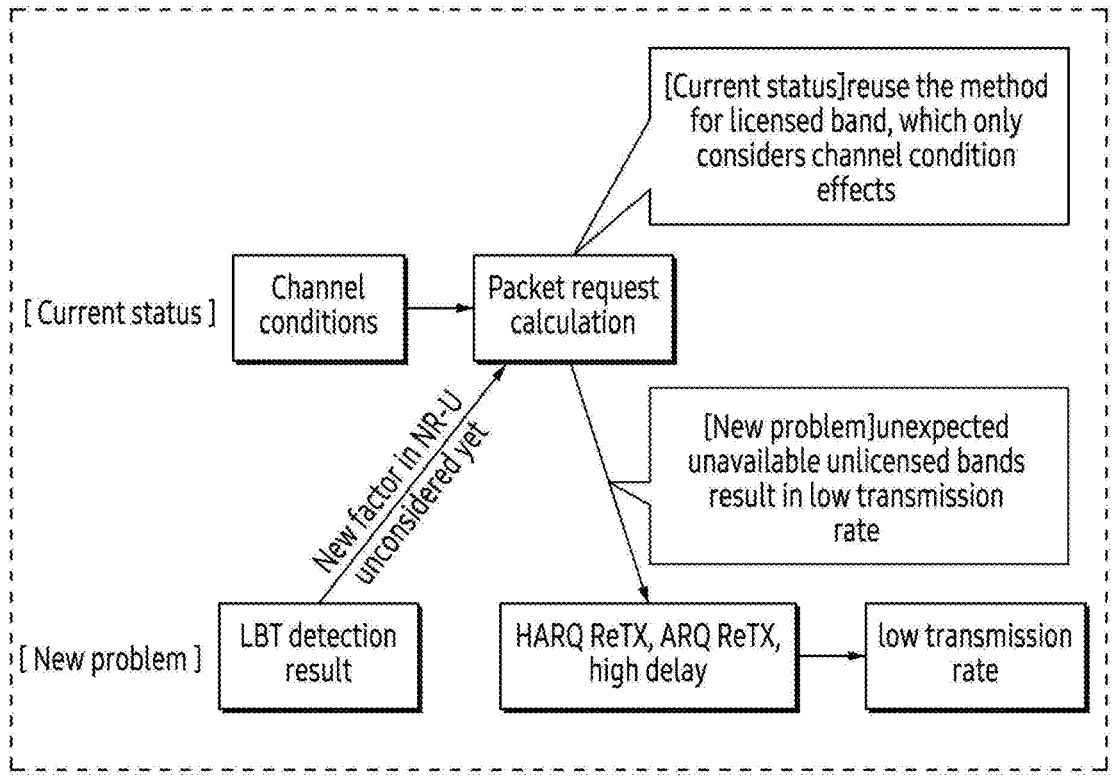
FIG. 3 is a diagram illustrating that an impact on data packet allocation caused by a failure of LBT detection is not considered according to an embodiment of the disclosure.

FIG. 3 is a diagram illustrating that the impact on data packet allocation caused by the failure of LBT detection is not considered according to an embodiment of the disclosure.

Referring to FIG. 2, there are a large number of 5G users transmitting data via inter/intra band Carrier Aggregation (CA) technology or mixed bandwidth (BW) CA technology in licensed bands (such as 3.5 GHZ, 700 MHz or 28 GHz band), and the frequency resources of the licensed bands are significantly limited. For example, the available frequency resources in 3.5 GHz band are very limited (the blank part in the rectangular bar where 3.5 GHz is located in FIG. 2 represents available frequency resources, and the non-blank part in the rectangular bar represents frequency resources occupied by a large number of users), while the resources of unlicensed bands are very rich and usually available. Therefore, 5G network nodes may not only use licensed bands, but also use unlicensed bands for data transmission. However, interference of other systems (e.g., WiFi) cannot be effectively identified in NR-U. For example, when the WiFi router in FIG. 2 is close to an NR-U terminal and a WiFi terminal is far from the NR-U terminal, if the WiFi system is in a state of transmitting by the WiFi terminal and receiving by WiFi router by using a specific unlicensed band, because the NR-U terminal is far from the WiFi terminal, WiFi signals cannot be effectively detected when the NR-U terminal performs LBT detection for the specific unlicensed band, but the specific unlicensed band is actually occupied by the WiFi system, and at this time, the WiFi router becomes a hidden terminal for the NR-U terminal, that is, a hidden terminal. Conversely, for example, when the NR-U terminal receives data packets from the network node using a specific unlicensed band, the WiFi apparatus in the WiFi system (e.g., the WiFi router in FIG. 2) may also use the specific unlicensed band to transmit data packets to its users (e.g., the laptop in FIG. 2), and at this time, the NR-U terminal becomes a hidden terminal for the WiFi router. Therefore, hidden terminals in the WiFi system may affect the accuracy of LBT detection results. A hidden terminal may refer to a receiving apparatus in other system that uses the same band as the unlicensed band used by the network node.

The 3rd Generation Partnership Project (3GPP) protocol does not limit the specific implementation of data packet requests. Referring to FIG. 3, a method for a licensed frequency band is repeatedly used in the current status, that is, for an unlicensed band, the same method as the method for the licensed frequency band is used when calculating the number of packet requests. However, this method only considers channel conditions of the secondary carrier, but there is no correlation between the transmission opportunity of the carrier and the channel conditions, and LBT detection may fail, which may cause the problem of low transmission rate caused by unavailable unlicensed band that is not considered. Transmission opportunity is obtained through competition between nodes using the unlicensed band. Although an unlicensed band Scell has a good channel condition (e.g., Signal to Interference plus Noise Ratio (SINR)), the communication of equipment using the unlicensed band in the other system will result in the failure of LBT detection (i.e., the new factor in NR-U shown in FIG. 3). The failure of LBT detection will cause the base station to lose the transmission opportunity at this moment. The failure of LBT detection will result in an increase in the number of hybrid automatic retransmission quest transmissions (HARQ ReTX), an increase in the number of automatic retransmission quest transmissions (ARQ ReTX), and a high delay, which will eventually result in a lower transmission rate.

On the other hand, the granularity of data packet requests is at a carrier level (e.g., 100 MHz). The carrier may contain some sub-bands (e.g., 20 MHz). The traffic data from the UE may be transmitted by a plurality of sub-band resources based on the bandwidth part (BWP) configuration. LBT detection belongs to the sub-band level (20 MHz) in NR-U. Carrier level data packet request will distribute UE data packets in a plurality of sub-bands. However, the failure of LBT detection in one of the plurality of sub-bands will result in the loss of data packets in the failed sub-band, and then the decoding of the data of the entire carrier is likely to fail. Therefore, the data packet request of the carrier sub-band will bring more HARQ ReTX and ARQ ReTX, as a result, the transmission rate decreases.

In addition, for data retransmission, in the prior art, data is transmitted only on the primary carrier (in Pcell, using the licensed band).

Figure 4:
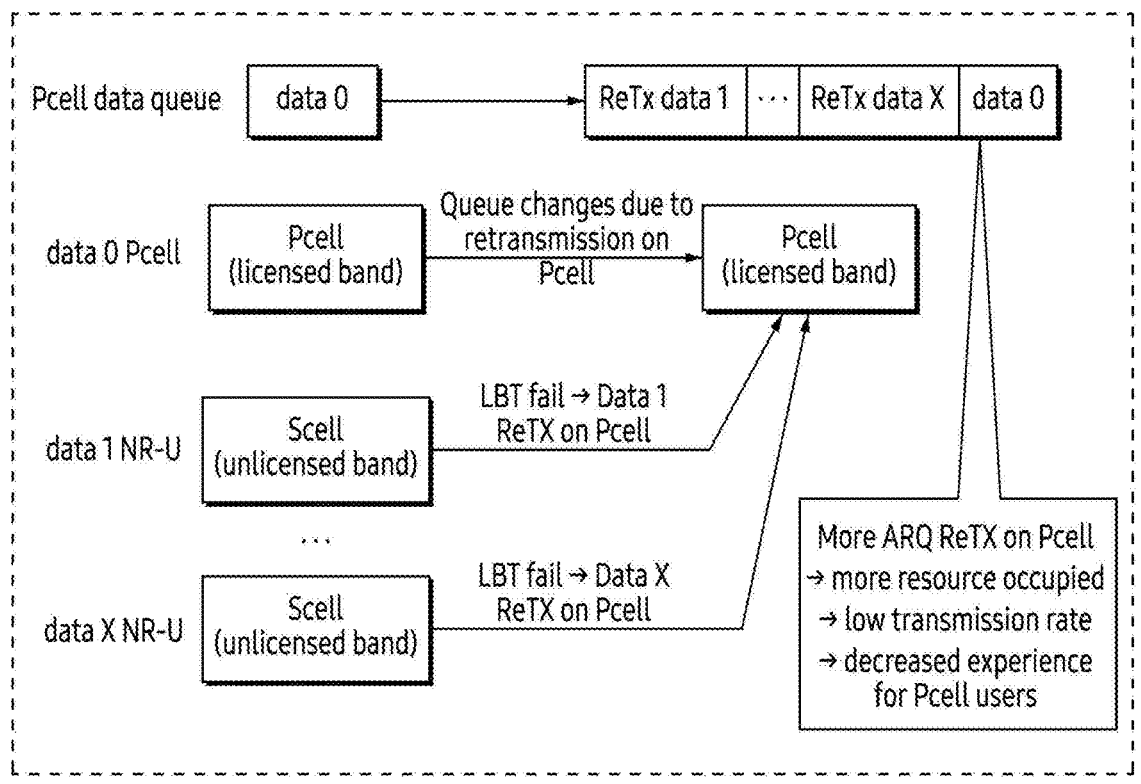
FIG. 4 is a diagram illustrating that data is retransmitted by using a licensed band according to an embodiment of the disclosure.

FIG. 4 is a diagram illustrating that data is retransmitted by using a licensed band according to an embodiment of the disclosure. The 3GPP protocol does not specify the implementation that which frequency band is selected for data retransmission.

Referring to FIG. 4, retransmitted data packets are transmitted only on the primary carrier (on Pcell) using a licensed band. For example, data 0 is initially transmitted on Pcell, and data 1 to data X are initially transmitted on Scell. When an unlicensed band carrier is used as Scell, although the channel conditions for this unlicensed band are very good, because the LBT detection fails, more ARQ ReTXs will become, as shown in FIG. 4, causing data 1 to data X to be retransmitted on Pcell. However, signalling resources of Pcell are limited (e.g., Physical Downlink Control Channel (PDCCH) resources are limited). More ARQ ReTXs will occupy more resources. Because ARQ ReTXs occupy resources, the shortage of resources on Pcell will reduce the experience of Pcell users. In addition, because data 1 to data X are retransmitted on Pcell, which may cause data queue (data 0 to data X) to change, as shown in FIG. 4, which may change as data I to data X then to data 0.

On the other hand, due to the uncertainty of LBT detection results, it is difficult to ensure the stability of transmission of unlicensed band carrier.

Figure 5:
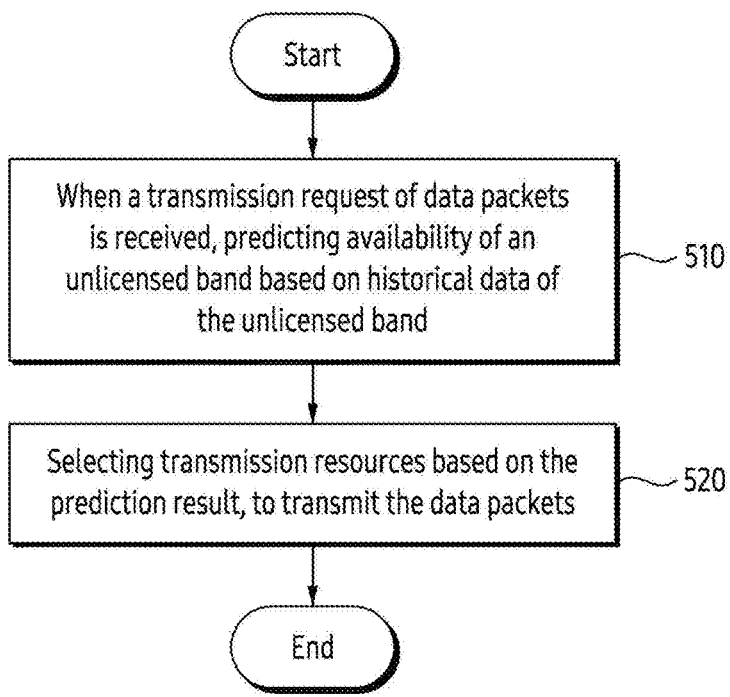
FIG. 5 is a flowchart illustrating a method performed by a network node according to an embodiment of the disclosure.

FIG. 5 is a flowchart illustrating a method 500 performed by a network node according to an embodiment of the disclosure. The network node may be various electronic apparatus at network side, for example, but not limited to, a base station, a radio station, a relay equipment, etc.

Referring to FIG. 5, at operation 510, when a transmission request of data packets is received, the base station may predict availability of an unlicensed band based on historical data of the unlicensed band. Availability of each unlicensed band may be predicted based on historical data of each unlicensed band. The historical data of each unlicensed band may include historical availability data of the corresponding unlicensed band. The historical availability data may include detection result of LBT detection on the corresponding unlicensed band. At operation 510, the base station may select transmission resources based on the prediction result, to transmit the data packets. In other words, the selecting of transmission resources based on the prediction result is used to transmit the data packets.

The unlicensed band may include at least one of a carrier level band and a sub-band level band. The unlicensed band may be a carrier level band obtained by dividing a specific unlicensed band into a plurality of carrier level bands. Alternatively, the unlicensed band may be a sub-band level band obtained by dividing a specific unlicensed band into a plurality of carrier level bands, and dividing each of the plurality of carrier level bands into a plurality of sub-band level bands. Thereby, the disclosure may refine the data packet request from the carrier level to the sub-band level.

Figure 6:
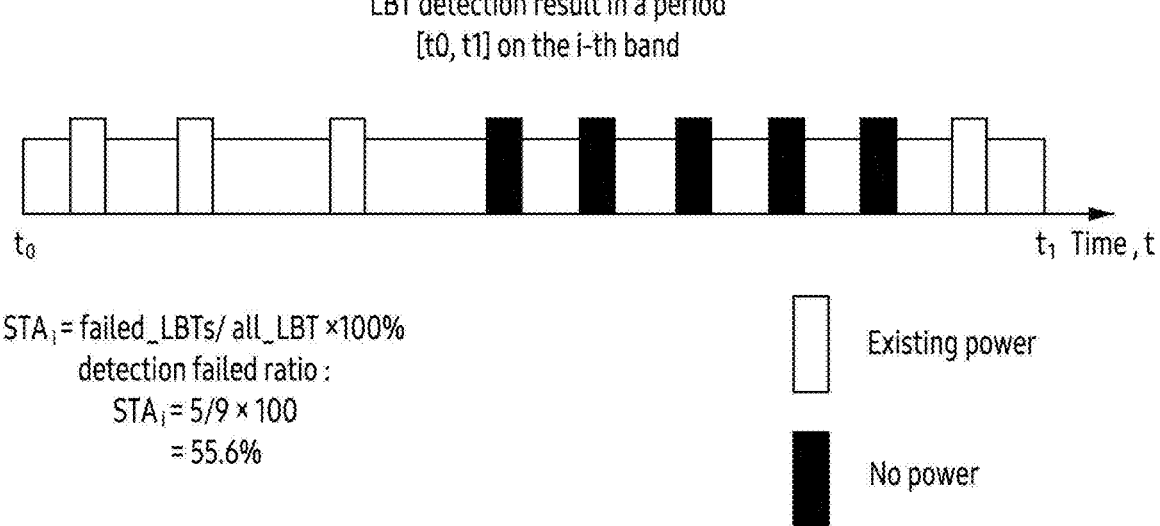
FIG. 6 is a diagram illustrating an example of predicting availability of an unlicensed band according to an embodiment of the disclosure.

FIG. 6 is a diagram illustrating an example of predicting availability of an unlicensed band according to an embodiment of the disclosure.

Referring to FIG. 6, the current unavailability ratio/ probability (success transmission probability (STA)) or LBT detection failure rate) of each unlicensed band may be obtained as the prediction result based on the following Equation 1:

$$STA_i = \text{failed\_LBTs/all LBT} \times 100\% \,. \qquad \text{Equation 1}$$

wherein all LBT is all LBT detection results in the [t0, t1] time period immediately before the current time on the i-th frequency band, and failed_LBTs are the failure results of LBT detection in [t0, t1] time period on the i-th frequency band. The above LBT detection results are the results of the first LBT detection among the two availability detection results of the frequency band (the results of the two LBT detection as shown in FIG. 1).

Figure 7:
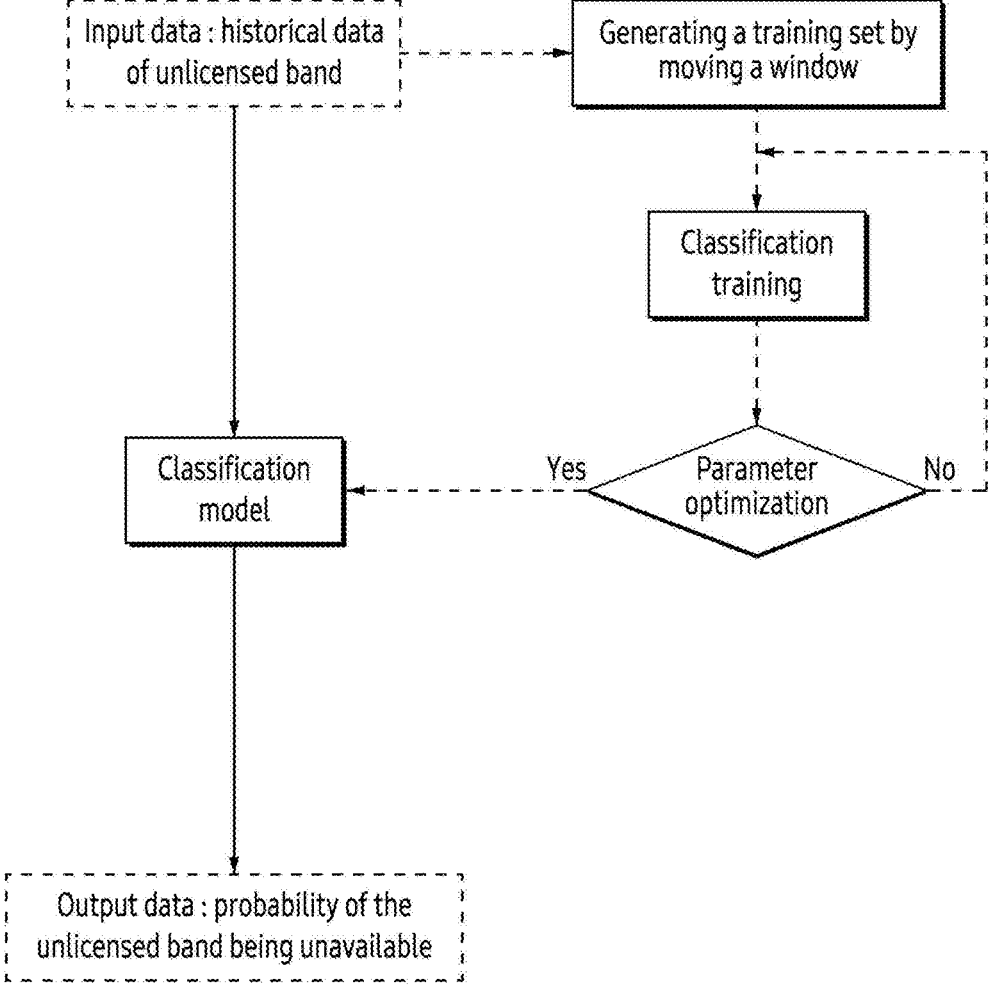
FIG. 7 is a diagram illustrating another example of predicting availability of an unlicensed band according to an embodiment of the disclosure.

FIG. 7 is a diagram illustrating another example of predicting availability of an unlicensed band according to an embodiment of the disclosure.

Referring to FIG. 7, a probability of the unlicensed band being unavailable may be obtained as the prediction result, by using a classification model, based on the historical data of the unlicensed band. Considering that the traditional regression prediction cannot directly provide the next probability of the unlicensed band being unavailable, thus, the regression prediction may be considered as a graph classification problem. In an example of the disclosure, only as an example, a classification model is used for prediction. The classification model may be obtained by classification training based on the historical data of the unlicensed band as a training set, for example, the classification model may be Support Vector Machine (SVM), perceptron, and the like. Since the prediction result of the unlicensed band may be expressed as "0" and "1" (unavailable and available) and has the probability (confidence level) for "0" and "1", the probability of the unlicensed band being unavailable at a next scheduling time may be predicted. The confidence level may be considered as the probability of the unlicensed band being unavailable. That is, the output of the classification model may be the probability of the unlicensed band being unavailable, predicted by the classification model.

The input of the classification model may be the historical data of the unlicensed band, for example, the historical availability data of the unlicensed band. The historical availability data of the unlicensed band may be the historical result data of the first availability detection (the first LBT detection of the two LBT detections as shown in FIG. 1).

In addition, the historical data of the unlicensed band may include the historical availability data of the unlicensed band and the historical feedback data of HARQ for the unlicensed band, wherein the historical feedback data of HARQ may be the data fed back to the network node by the user who receiving the data packets according to whether the data packets is received, and it may reflect the interference conflict risk caused by a time interval between the two availability detections and the impact of hidden terminals. According to an embodiment of the disclosure, the historical availability data of the unlicensed band may be modified by using the above historical feedback data, and the availability of the unlicensed band may be predicted based on the modified historical availability data. According to an embodiment of the disclosure, the modifying of the historical availability data of the unlicensed band by using the above historical feedback data may include: if historical feedback data for a specific time among the historical feedback data is Negative Acknowledgement (NACK), historical availability data of the unlicensed band for the specific time is modified. In addition, according to an embodiment of the disclosure, the modifying of the historical availability data of the unlicensed band by using the above historical feedback data may include: if the network node is in a discontinuous transmission (DTX) mode at a specific time, historical availability data of the unlicensed band for the specific time is modified; if the network node is not in the discontinuous transmission (DTX) mode at the specific time, and if historical feedback data for the specific time among the historical feedback data is Negative Acknowledgement (NACK), historical availability data of the unlicensed band for the specific time is modified. That is, the input of the classification model may also be the modified historical availability data. Thus, the problem of the hidden terminals and the inconsistency between the two availability detection results of the band may be solved, and the reliability of the obtained probability (STA) of the unlicensed band being unavailable is improved. The process of modifying the historical availability data of the unlicensed band will be described in detail below with reference to FIG. 8.

Figure 8:
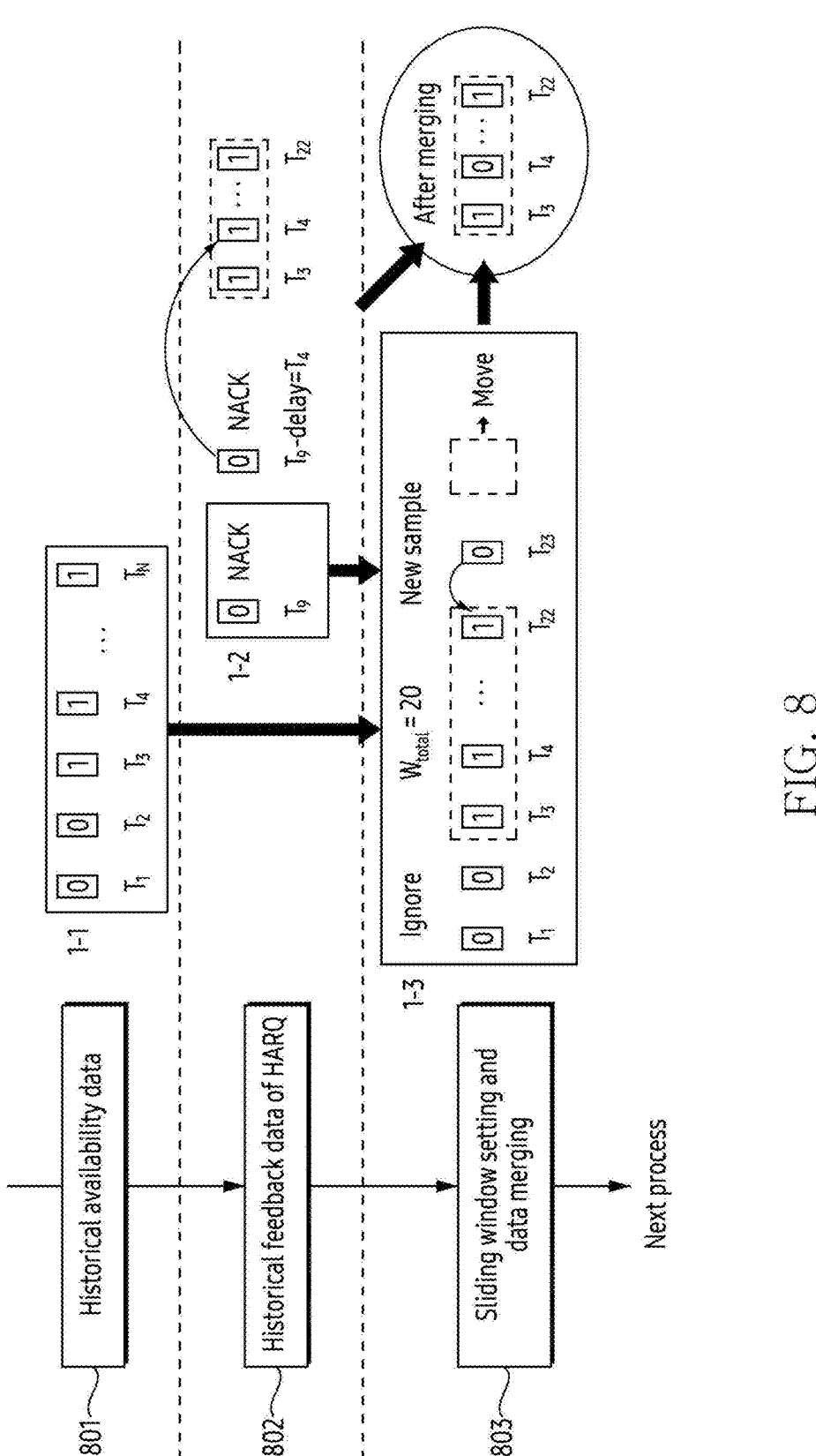
FIG. 8 is a diagram illustrating a process of modifying historical availability data of an unlicensed band according to an embodiment of the disclosure.

FIG. 8 is a diagram illustrating a process of modifying a historical availability data of an unlicensed band according to an embodiment of the disclosure.

Referring to FIG. 8, at operation 801, the historical availability data of each unlicensed band may be collected. In FIG. 8, "0" and "1" may represent that energy is not detected and energy is detected, respectively (corresponding to that the corresponding unlicensed band is unavailable and available, or the detection failed and succeeded), and accordingly, the system time (e.g., T1, T2, T3, T4 . . . ) for each detection for availability may recorded.

At operation 802, historical feedback data of HARQ of the corresponding unlicensed band may be collected. For example, the historical feedback data of HARQ of the corresponding unlicensed band may be received at a system time T9, and the system time T9 may be recorded. The historical feedback data of HARQ may include NACK and Acknowledgement (ACK). The interference conflict of the availability detection (such as LBT detection), the hidden terminals and the poor channel conditions may result in feeding back NACK. However, since the historical feedback data reflects the availability of the unlicensed band corresponding to the time when the data packets are actually transmitted, there is a delay between the time when the historical feedback data is received and the system time when the corresponding availability detection result is obtained, thus, for example, as shown in FIG. 9, the system time T9 when the historical feedback data NACK (i.e., the historical feedback data for a specific time) is received, may be adjusted to T4 according to the delay, to adjust the historical availability data of T4 (i.e., the historical availability data for the specified time) from "1" to "0".

In addition, if a Downlink Control Information (DCI) format of the network node supports the DTX mode at a specific time (in this mode, the user may not feedback NACK/ACK), the network node may automatically/directly change the historical availability data at the corresponding time to "0", which corresponds to ignoring the NACK/ACK feedback. If the DCI format of the network node does not support DTX at the specific time, and if the historical feedback data for the specific time among the historical feedback data is NACK, the historical availability data for the specific time is modified.

At operation 803, a sliding window with limited length may be used. For example, the length of the sliding window Wtotal sets to 20 pieces of data transmission duration (T3 to T22 as shown in FIG. 8). When new sample is received (such as availability data of T23 as shown in FIG. 8), the sliding window may be moved to protect constant elements (i.e., the availability data of T3 to T22), and the corresponding corrected historical availability data (e.g., "0" at the system time T4) may be merged into the sliding window (i.e., "1" at the system time T4 may be replaced), to carry out a next process, that is, training and predicting based on the modified historical availability data.

Figure 9:
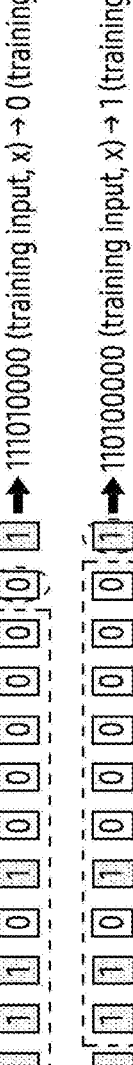
FIG. 9 is a diagram illustrating an example of a method of generating a training set of a classification model by moving a window according to an embodiment of the disclosure.

FIG. 9 is a diagram illustrating an example of a method of generating a training set of a classification model by moving a window according to an embodiment of the disclosure.

Since the conditions of occupying sub-band of WiFi may be modelled mathematically (e.g., using Carrier Sense Multiple Access (CSMA) detection), referring to FIG. 9, the window size may be defined as 10 (the window size may be determined by a single transmission duration of WiFi), and the training set may be acquired by right shifting based on the historical availability data (e.g., the modified historical availability data, including 0 or 1) of the corresponding unlicensed band, wherein 1 may mean that the unlicensed band is available (energy is detected), 0 may mean that the unlicensed band is unavailable (energy is not detected), and then the classification model may perform classification training and parameter optimization based on the generated training set.

As an example, as shown in FIG. 9, as a group of data in the training set, historical data {1 1 1 0 1 0 0 0 0 0} may be used as the training input x of the model, and the availability (0) of the unlicensed band at a next time immediately following the historical data may be used as the training output y of the model. Thereafter, the window may be shifted one bit to the right to obtain another group of data in the training set, historical data {1 1 0 1 0 0 0 0 0 0} is used as the training input of the model, and the availability (1) of the unlicensed band at a next time immediately following the historical data may be used as the training output of the model. By using the training set obtained in this way, the classification model may be optimally trained (e.g., by using the SVM cost and gamma parameters), thereby the classification model can be used to predict the availability of the unlicensed band. For example, the confidence probability of SVM with the classification result of "0" is used as the probability (the prediction result, STA) of the unlicensed band being unavailable, for subsequent steps.

The network node may transmit the data packets based on the above prediction result.

According to an embodiment of the disclosure, the number of data packets capable of being allocated to each unlicensed band may be determined based on the above prediction result, and the data packets may be transmitted by using each unlicensed band according to the determined number.

According to an embodiment of the disclosure, the success transmission probability (STP) of the unlicensed band may be further determined according to the above prediction result to select transmission resources, for example, to select appropriate band carriers/sub-bands, so as to improve the transmission efficiency of the data packets.

According to an embodiment of the disclosure, the STP value of each unlicensed band may be determined based on a preset mapping relationship between the probability (STA) of the unlicensed band being unavailable and the success transmission probability (STP), and the number of data packets capable of being allocated to each unlicensed band may be determined based on the STP value of each unlicensed band.

Figure 10:
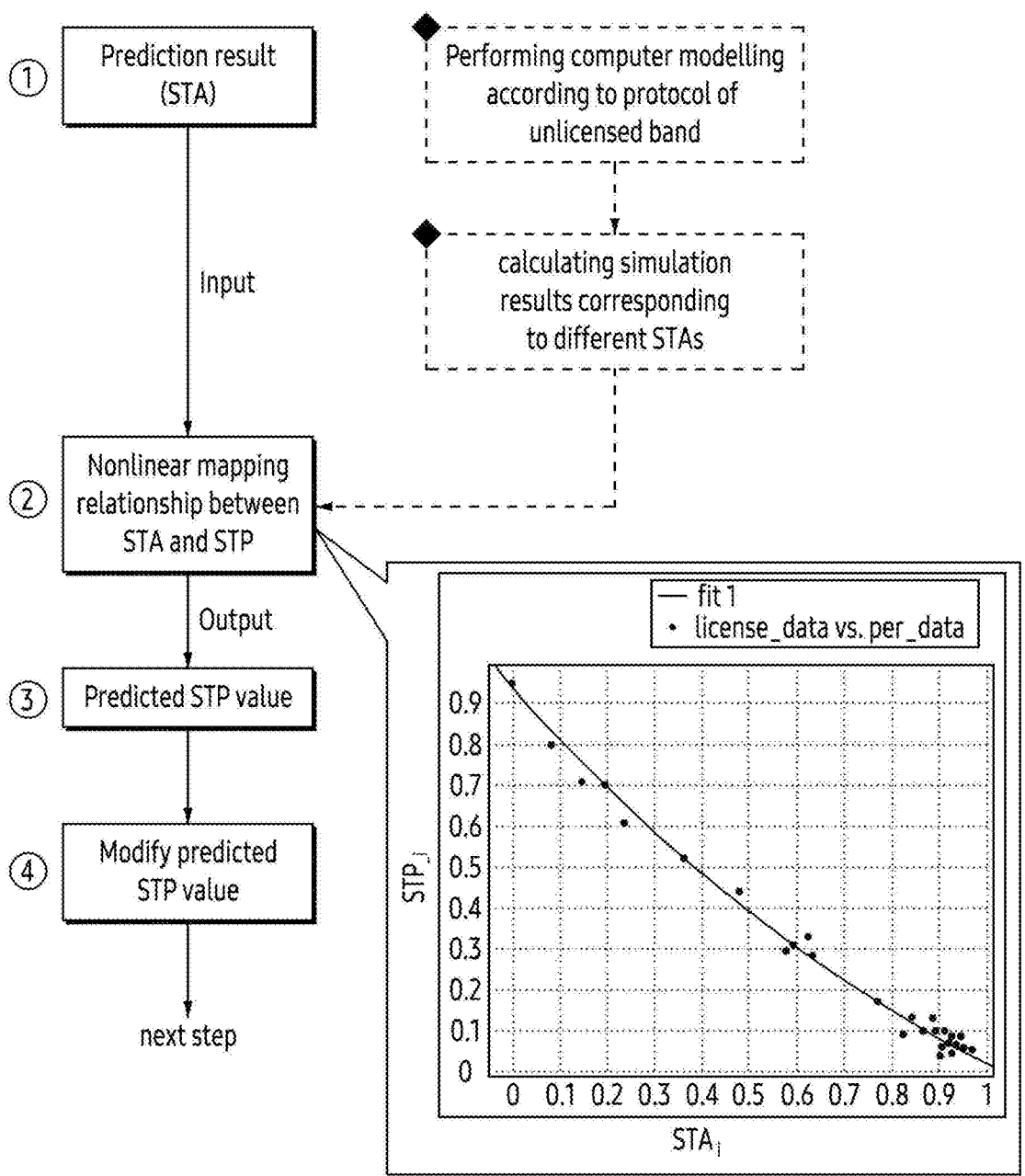
FIG. 10 is a diagram illustrating an operation of determining a success transmission probability (STP) value based on a preset mapping relationship between STA and STP according to an embodiment of the disclosure.

FIG. 10 is a diagram illustrating an operation of determining the STP value based on the preset mapping relationship between STA and STP according to an embodiment of the disclosure.

Due to the time deviation caused by the availability detection mechanism of the band and the problem of hidden terminals (e.g., in WiFi), and the obtained prediction result is the prediction result for a single transmission duration of WiFi, the success transmission probability (STP) of each unlicensed band may not be directly obtained based on the probability (STA) of the corresponding unlicensed band being unavailable, that is, $STP_i \neq 1 - STA_i$. The mapping relationship between STA and STP may be obtained based on multiple simulations. Since the behaviour of the network node using the unlicensed band conforms to related protocols, for example, Carrier Sense Multiple Access with Collision Avoidance (CSMA/CA) may be used, that is, for example, the conditions of occupying a band of WiFi may be mathematically modelled, and the behaviour of the network node may be simulated and modelled. In addition, since the behaviour of LAA is the same, simulation results corresponding to STA may be calculated.

Referring to FIG. 10, the preset mapping relationship between STA and STP may be obtained by performing computer modelling according to the protocol of the unlicensed band and calculating the simulation results corresponding to different STAs. The mapping relationship may be a nonlinear mapping relationship of a single transmission duration between WiFi and NR-U, that is, the STP obtained according to the mapping relationship is the STP for the single transmission duration of NR-U. In addition, the behaviour rule of the network node using the unlicensed band may also be established by fitting the measured data, to obtain the preset mapping relationship between STA and STP. The curve of the obtained nonlinear mapping relationship (as shown in FIG. 10) may be expressed as in Equation 2 below:

$$STP_i = 1.713 * \exp[-0.7787 * (STA_i)] - 0.77 \qquad \text{Equation 2}$$

Wherein $STA_i$ may represent STA for the i-th unlicensed band, and $STP_i$ may represent the STP value for the i-th unlicensed band.

The input of the preset mapping relationship between STA and STP may be the probability (i.e., STA) of the unlicensed band being unavailable obtained based on prediction, and the output may be the (predicted) STP value.

However, it should be understood that the disclosure is not limited thereto, and such a mapping relationship may be established in other ways, and the success probability of transmitting data packets in the unlicensed band may be obtained by using the prediction result in other different ways.

In addition, since there may already be other NR-U users occupying resources in the corresponding unlicensed band, the available resources for new NR-U users become less. Therefore, the STP value may be further modified based on the available band resources of the corresponding unlicensed band.

According to an embodiment of the disclosure, when data is initially transmitted, a first STP value (i.e., the predicted STP value) may be determined based on the preset mapping relationship between the probability of the unlicensed band being unavailable and the STP, and the first STP value may be modified based on a first available resource factor of the unlicensed band, to obtain a second STP value as the STP value of the unlicensed band (i.e., the modified STP value), and the number of data packets capable of being allocated to the unlicensed band may be determined based on the modified STP value. The first available resource factor may be related to the number of users that transmit data on the unlicensed band. For example, the available band resources of the unlicensed band is determined based on the number of users that transmit data on the unlicensed band (e.g., a ratio of remaining band resources obtained by subtracting band resources occupied by the users that transmit data on the unlicensed band from total band resources of the unlicensed band to the total band resources of the unlicensed band, which may be expressed as the first available resource factor described above), to modify the STP value based on the available band resources (e.g., which may be represented as Ai below). For example, the STP value may be modified by the following Equation 3:

$$STP_i' = STP_i \times A_i \qquad \text{Equation 3}$$

wherein STPi' may represent the modified STP value for the i-th unlicensed band, and Ai may represent the first available resource factor.

In addition, according to an embodiment of the disclosure, the STP value obtained through the above processing for the unlicensed band may be stored as a historical STP value for the unlicensed band. When the network node receives a new transmission request for data packets, the network node may determine whether to predict the availability of the unlicensed band based on the historical STP value included in the historical data of the unlicensed band. When the historical STP value for the unlicensed band exceeds a first preset threshold, it is determined to predict the availability of the unlicensed band, and the step described above of predicting the availability of the unlicensed band based on the historical data of the unlicensed band are performed. That is, in the case that the historical data of the unlicensed band includes the historical STP value, the network node may filter the unlicensed band, perform prediction only for the availability of the unlicensed band with the historical STP value exceeding the first preset threshold, and allocate the corresponding data packets. Considering that only the historical STP value in the latest period can accurately reflect the latest changes in the availability of the band, the historical STP value included in the historical data of the unlicensed band may include a mean value of historical STP values within a set time length before a current time. For example, the above historical STP value may be the mean value of the historical STP value within a specific time window Twifi before the current time, but not limited thereto, for example, it may also be other statistical value or just the last STP value. Twifi may be a duration of a single WiFi user transmission period.

If there is no historical STP value for a specific unlicensed band, the availability of the unlicensed band may be predicted directly based on the historical availability data (e.g., the modified historical availability data) to obtain the STP value based on the prediction result, and the data packets may be allocated based on the STP value.

Figure 11:
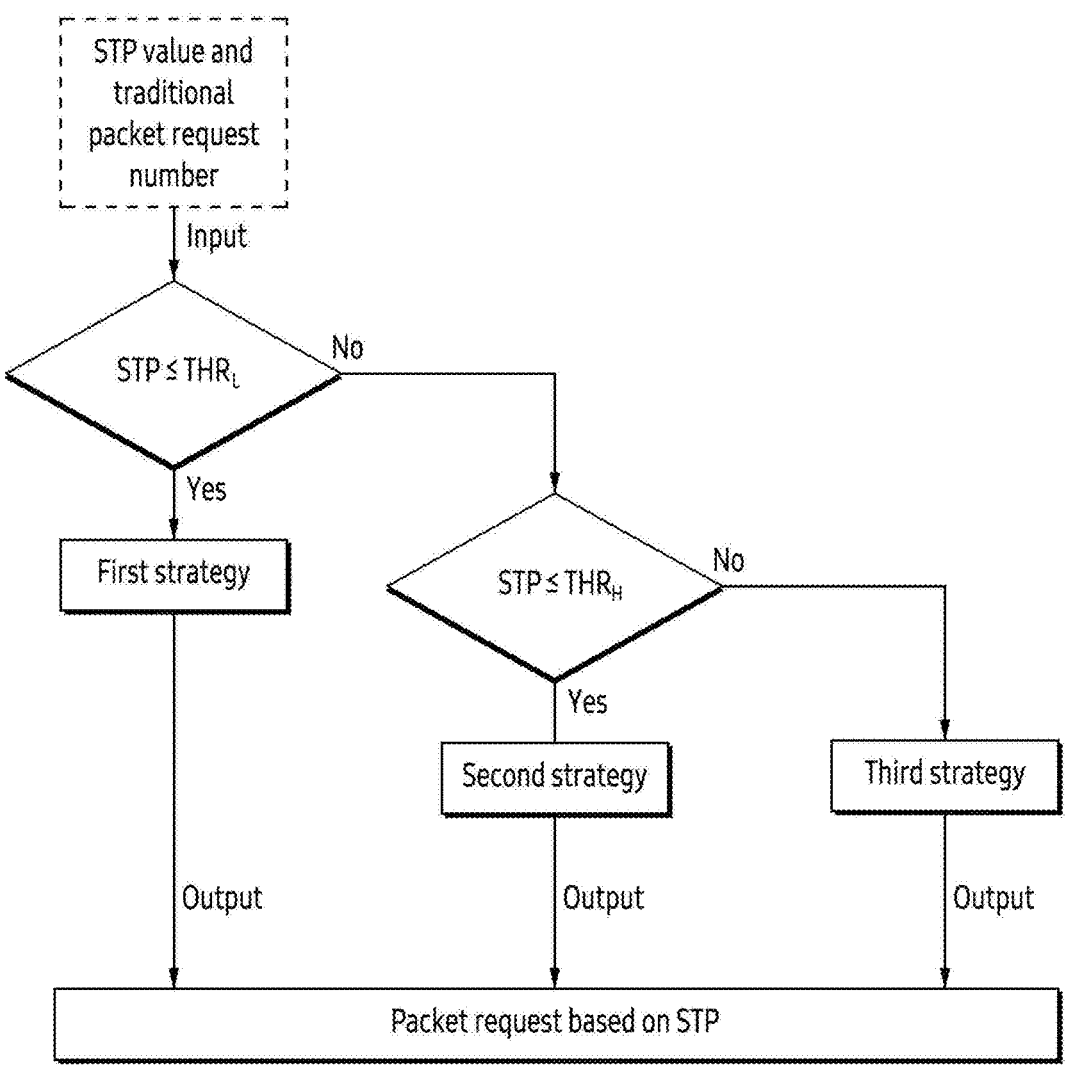
FIG. 11 is a diagram illustrating an operation of determining a number of data packets capable of being allocated to an unlicensed band based on an STP value according to an embodiment of the disclosure.

FIG. 11 is a diagram illustrating an operation of determining a number of data packets capable of being allocated to an unlicensed band based on a STP value according to an embodiment of the disclosure.

Figure 12:
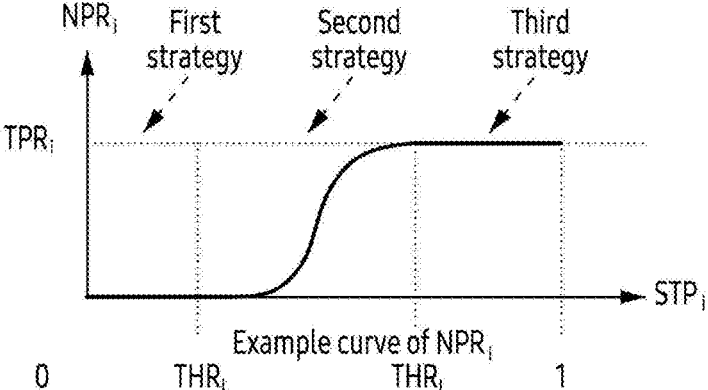
FIG. 12 illustrates an example curve between an STP value and a number of the corresponding allocated data packets according to an embodiment of the disclosure.

FIG. 12 illustrates an curve between the STP value and the number of the corresponding allocated data packets according to an embodiment of the disclosure.

In the prior art, the traditional packet request only depends on the wireless channel conditions (channel transmission capacity). For example, the Transport Block Size (TBS) is calculated by the signal to interference noise ratio (SINR). In the prior art, based on the first availability detection result of the unlicensed band in the last transmission being successful, the availability of the unlicensed band may be detected subsequently, and when the detection passes, the data packets is allocated based on the Transport Block Size calculated above for transmission. However, for the unlicensed band, the corresponding data packet request is limited by STP, so the successful transmission on the carrier/sub-band of the unlicensed band may be difficult to be guaranteed.

For this, according to an embodiment of the disclosure, in addition to considering the channel transmission capability of each unlicensed band, the STP value of each unlicensed band may also be further considered. For example, two thresholds (low threshold and high threshold, or called a first threshold value and a second threshold value) set for the STP value, and three branches may be taken to allocate the number of data packets capable of being transmitted on the unlicensed band, as shown in Equation 4 below:

$$NPR_i = \begin{cases} 0, \text{strategy1} : STP_i \in [0, THR_L) & \text{Equation 4} \\ \left\lfloor \exp\left[ \dfrac{STP_i - THR_L}{THR_H - THR_L} \cdot \ln(TPR_i) \right] \right\rfloor, \\ \quad \text{strategy2} : STP_i \in [THR_L, THR_H) \\ TRP_i, \text{strategy3} : STP_i \in [THR_H, 1] \end{cases}$$

Wherein NPR represents the number of data packets capable of being transmitted on the unlicensed band, $THR_L$ may represent the first threshold value of STP, $THR_H$ may represent the second threshold value of STP, and $\lfloor \ \rfloor$ may be floor operation, traditional packet request (TPR) may represent the traditional packet request number on the unlicensed band (e.g., the number of data packets allocated on the corresponding unlicensed band, calculated based on the traditional solution, which may also be called the number of data packets that UE waits to schedule, or the packet request number determined based on the transmission capacity of the licensed band, which represents an initial transmission capacity of the unlicensed band), and i may represent the i-th unlicensed band.

Referring to FIGS. 11 and 12, when the STP value is not greater than the first threshold value, the number of data packets capable of being transmitted on the corresponding unlicensed band may be determined by using a first strategy. That is, when the STP value is less than the first threshold value, the number of data packets capable of being allocated to the unlicensed band is a first number. For example, the first number may be 0, and data packets may not be allocated to the unlicensed band. For example, the first number may be 1 (this data packet is an empty data packet), and at this time, there is only a small number of packet request number for ensuring the availability detection of the band, to detect whether the corresponding unlicensed band is actually available. When the STP value is not less than the first threshold value and not higher than a second threshold value, a second strategy may be used to determine the number of data packets capable of being transmitted on the unlicensed band based on the STP value, and at this time, the number of data packets capable of being allocated to the unlicensed band is a second number. The second number is positively correlated to the STP value, and the second number changes according to the STP value, which also reflects the predicting of the availability of the unlicensed band. For example, the second number may be equal to $$\left\lfloor \exp\left[ \frac{STP - THR_L}{THR_H - THR_L} \cdot \ln(TPR) \right] \right\rfloor.$$

When the STP value is not less than the second threshold value, the number of data packets capable of being transmitted on the unlicensed band may be determined by using a third strategy, and at this time, the number of data packets capable of being allocated to the unlicensed band is a third number, for example, the third number may be the traditional packet request number on the unlicensed band (i.e., the packet request number determined based on the transmission capacity of the licensed band, the maximum number of data packets capable of being allocated to the unlicensed band), and in this case, the unlicensed band may be equivalent to the licensed band.

THR$_L$ and THR$_H$ may be set based on the historical transmission conditions of the unlicensed band. For example, initial values of THR$_L$ and THR$_H$ are set first. If the THR$_H$ value is set to a smaller value, when the STP value is greater than the THR$_H$ value, since a large number of data packets are allocated to the unlicensed band, the transmission of a part of the data packets is failed, accordingly, the THR$_H$ value may be adjusted based on this failed result.

According to an embodiment of the disclosure, the above STP value based on which the data packets are allocated may be an unmodified STP value, or a STP value modified based on available band resources (such as the first available resource factor described above).

After the number of data packets capable of being allocated to carriers/sub-bands of each unlicensed band is determined, the availability of carriers/sub-bands of each unlicensed band may be detected, the available carriers/sub-bands of the unlicensed band may be allocated with the corresponding determined number of data packets, and MAC layer protocol data unit (MAC PDU) may be built, and modulation and coding may be performed in the physical layer. When the availability detection performed again for the above available unlicensed bands passes before NR transmission of data packets, the corresponding determined number of data packets will be transmitted on these unlicensed bands.

Thereafter, when a retransmission request of the data packets is received, or the RLC timer expires, or the availability detection performed again does not pass and the number of HARQs is greater than a preset number, the network node may retransmit the data packets.

For the method of allocating bands for the retransmission of data packets, the prior art is affected by the retransmission priority being higher than the initial transmission priority since the automatic retransmission request transmission (ARQ ReTX) is only performed on the primary cell of the licensed band, resulting in a sharp drop in the rate of users transmitting data on the primary cell. In order to alleviate the traffic load of Pcell, in the retransmission of NR-U, extending highly reliable unlicensed band for retransmission based on multi factors may increase the user experience rate, which is very valuable. In an embodiment of the disclosure, carriers/sub-bands of the unlicensed band may be selectively used for ARQ ReTX.

According to an embodiment of the disclosure, when the received transmission request of the data packets is a retransmission request of the data packets, it may be determined whether to retransmit the data packets on each unlicensed band based on the prediction result (STA) of predicting the availability of each unlicensed band.

Whether the data packets can be retransmitted on each unlicensed band may be determined based on the STP value of each unlicensed band determined according to the preset mapping relationship between STA and STP.

According to an embodiment of the disclosure, when retransmitting data, a third STP value (i.e., the predicted STP value) may be determined based on the preset mapping relationship between STA and STP, and the third STP value may be modified based on a second available resource factor of the unlicensed band, to obtain a fourth STP value as the STP value of the unlicensed band (i.e., the modified STP value), and the network node may determine whether to retransmit the data packets on the corresponding unlicensed band based on the modified STP value. The second available resource factor may be related to the number of users retransmitting on the unlicensed band and/or the number of users initially transmitting on the unlicensed band. For example, the network node may adjust or modify the corresponding STP value based on the ratio of the number of users retransmitting on the corresponding unlicensed band to the number of users transmitting (including initially transmitting and retransmitting) data on the corresponding unlicensed band. For example, the STP value may be adjusted or modified by using the following Equation 5:

$$STP_i = STP_i \times (1 - D_{ARQ}) \qquad \text{Equation 5}$$

wherein DARQ may be the ratio of the number of users retransmitting on the i-th unlicensed band to the number of users transmitting data on the corresponding unlicensed band. Therefore, ARQ/HARQ retransmissions will not be crowded on the same band.

However, it should be understood by those skilled in the art that the above method of adjusting or modifying the STP value is not limited thereto, for example, the STP value is also be adjusted or modified according to factors such as the capability of the network node.

According to an embodiment of the disclosure, when the STP value (e.g., the modified STP value) of the unlicensed band is greater than a second preset threshold for the unlicensed band, it may be determined to retransmit the data packets on the unlicensed band.

Figure 13:
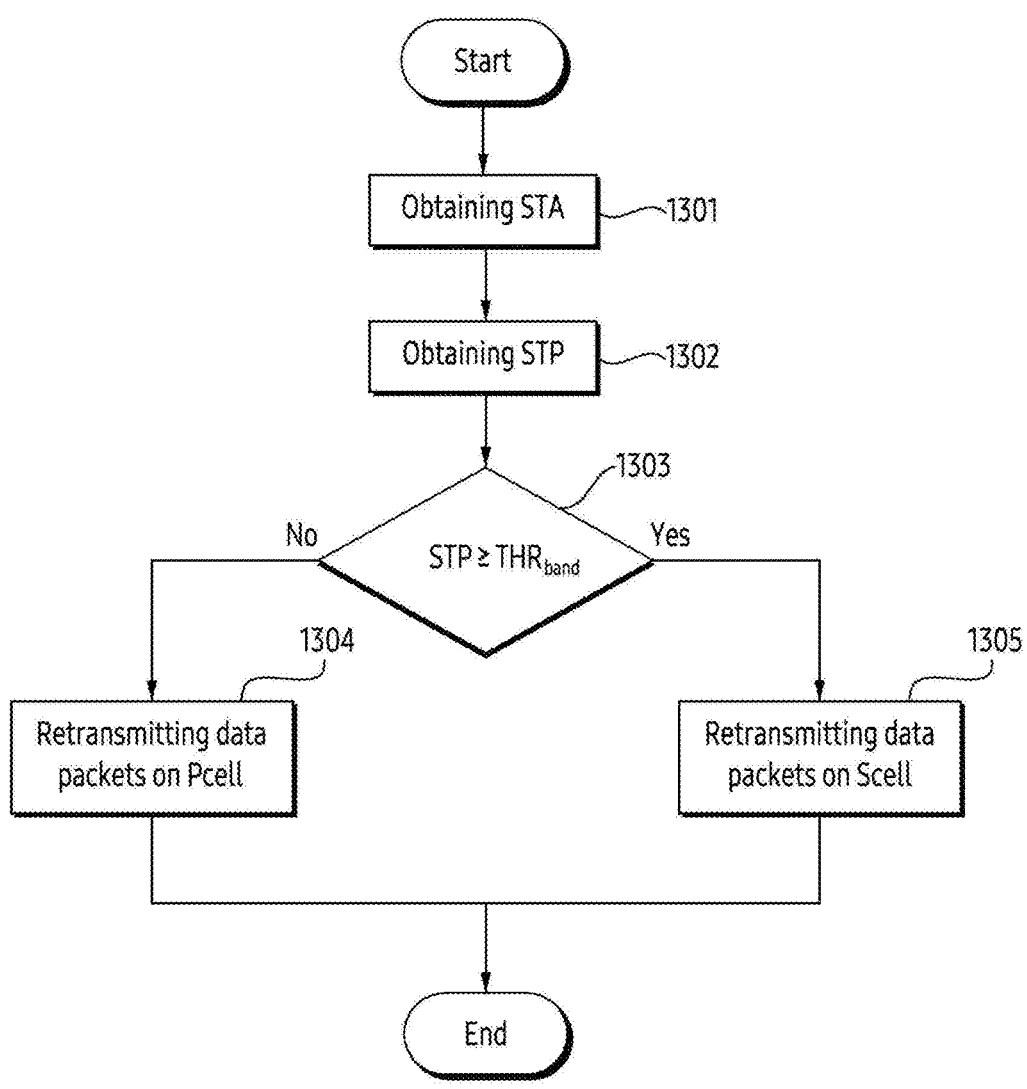
FIG. 13 is a diagram illustrating an operation of determining whether data packets may be retransmitted on an unlicensed band according to an embodiment of the disclosure.

FIG. 13 is a diagram illustrating an operation of determine whether data packets may be retransmitted on an unlicensed band according to an embodiment of the disclosure.

Referring to FIG. 13, at operation 1301, the STA of the unlicensed band may be obtained by predicting the availability of the unlicensed band, and then at operation 1302, STP (e.g., the adjusted or modified STP value, and the following STP value may refer to the adjusted or modified STP value) may be obtained based on STA. When the STP value is greater than the second preset threshold THRband for the unlicensed band ("Yes" at operation 1303), at operation 1305, it may be determined to retransmit the data packets on the unlicensed band (on Scell). When the STP value of all unlicensed bands is less than or equal to the second preset threshold THRband ("No" at operation 1303), it may be determined to retransmit the data packets on the licensed band (Pcell) at operation 1304. That is, this solution only considers a single factor, STP, which may directly represent the availability of the unlicensed band.

However, when on one unlicensed band, there are multiple users using the unlicensed band, the risk of NR-U transmission failure will increase. Therefore, the optimized version of the solution may be further provided as follows.

According to an embodiment of the disclosure, transmission resources may be selected for retransmission of data packets based on multi factors (STP and the following C1, C2). The reliability of the unlicensed band may also depend on the conditions (e.g., the total number C1 of users using the unlicensed band and the traffic load C2, which are unknown) of the unlicensed band. Specifically, candidate combinations of the number of users (C1) using the unlicensed band and the traffic load (C2, such as occupancy ratio of the band resources) of the unlicensed band may be determined based on a probability of the unlicensed band being historically unavailable (i.e., historical STA) and the predicted STA of the unlicensed band, and a candidate combination with a minimum variance/fluctuation of the number of the users is selected from among the candidate combinations, and the C1 and/or C2 are obtained based on the selected candidate combination, and whether to retransmit the data packets on the unlicensed band is determined based on the C1 and/or C2 and the STP value of the unlicensed band. The total number C1 of users using the unlicensed band may include the total number of users using the unlicensed band to communicate with the network node and the total number of users using the unlicensed band to communicate with other apparatus.

Figure 14:
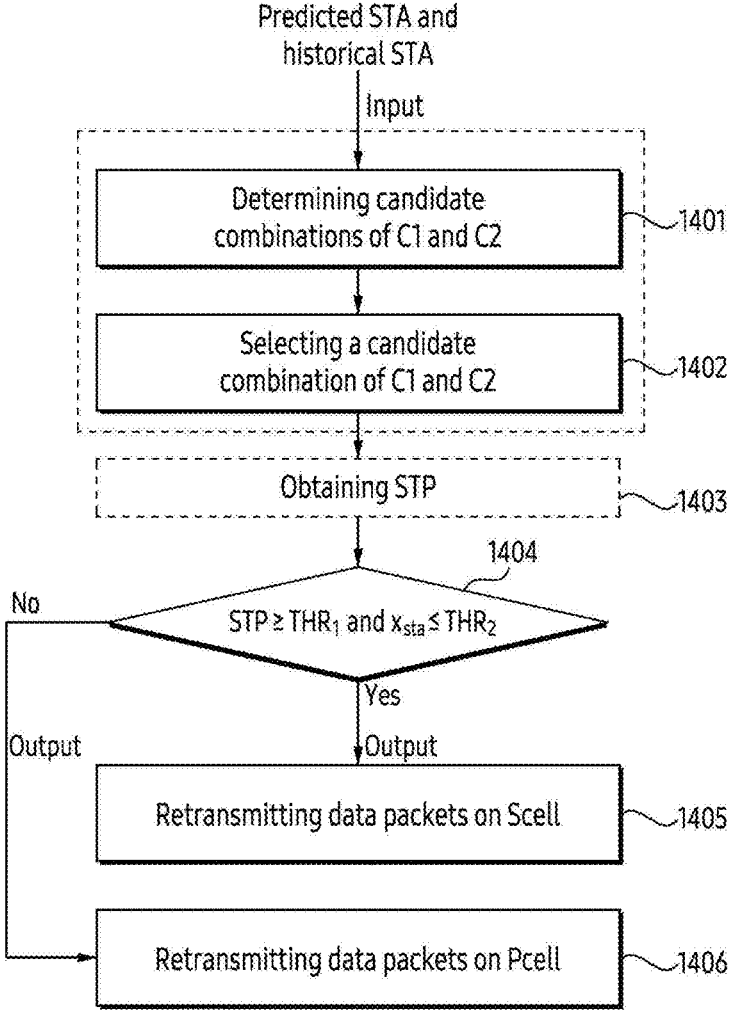
FIG. 14 is a diagram illustrating an operation of determining whether data packets may be retransmitted on an unlicensed band according to an embodiment of the disclosure.

FIG. 14 is a diagram illustrating an operation of determine whether data packets may be retransmitted on an unlicensed band according to an embodiment of the disclosure.

Figure 15:
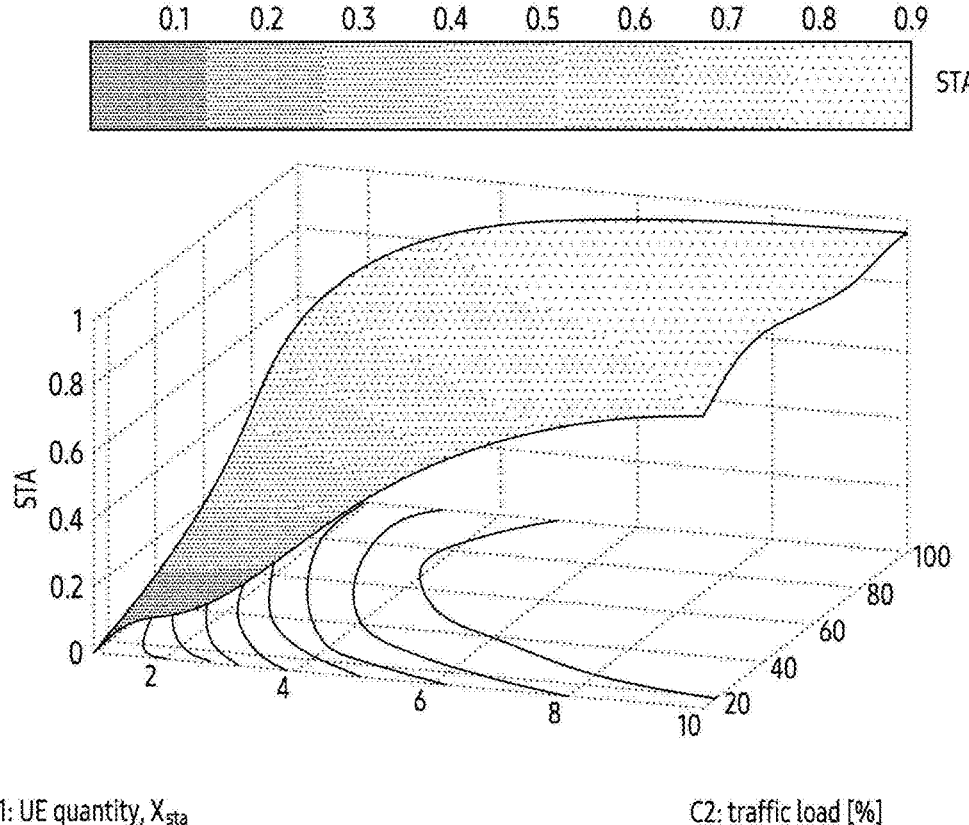
FIG. 15 is a diagram illustrating an example of a preset STA three-dimensional model according to an embodiment of the disclosure.

FIG. 15 is a diagram illustrating an example of a preset STA three-dimensional model according to an embodiment of the disclosure.

Referring to FIG. 14, at operation 1401, a plurality of candidate combinations of C1 and C2 on the unlicensed band may be determined based on the probability of the unlicensed band being historically unavailable and the predicted probability of the unlicensed band being unavailable (the historical STA and the predicted STA), according to the preset model, and at operation 1402, a combination of C1 and C2 with the minimum variance/fluctuation of C1 may be selected from among the plurality of candidate combinations. The selected C1 value is xsta, and xsta is an equivalent value of the actual total number C1 of users. That is, the selected C1 and C2 values are the predicted values.

The preset model may be the STA three-dimensional model as shown in FIG. 15. The mapping (i.e., the STA three-dimensional (3D) model as shown) between STA, C1 and C2 may be constructed according to a specific channel evaluation system that can implement the Wi-Fi CSMA mechanism.

As an example of obtaining the 3D model only, the 3D curved surface of C1, C2 and STA may be obtained by performing computer simulation on the STA values of the WiFi system under different number of WiFi users and different traffic loads. The curved surface formed by the STA value data obtained from the simulation has many burrs on the curved surface due to the influence of the simulation random numbers. In order to remove the effect of burrs caused by the random numbers, as an example, the principal component analysis method is adopted, and the discrete value of the traffic load is used as the constant vector Ec to perform the principal component analysis on STA, as shown in Equations 6 to 9 below:

$$STA_i = Ec_i \times PCs_i; \qquad \text{Equation 6}$$

$$PCs_i = [PCs_{i,1}, PCs_{i,2}, 0, \dots, 0]; \qquad \text{Equation 7}$$

$$PCs_{i,1} = \qquad \text{Equation 8}$$
$$5.003 * \exp(0.02762 * x_{sta}) + (-49.06) * \exp(-0.6537 * x_{sta});$$

$$PCs_{i,2} = 4.637 * \exp\{-(\ln(x_{sta}) - 1.122/0.7875)^2\} - 0.3506 - 2.5; \qquad \text{Equation 9}$$

wherein i may mean the unlicensed band. As shown in Equation 6, STA, may be divided into two vectors $Ec_i$ and $PCs_i$. $Ec_i$ is a constant vector and $PCs_i$ is a function related to the number of users ($x_{sta}$). As shown in Equation 7, PCs, may have two function values ($PCs_{i,1}$ and $PCS_{i,2}$ shown in Equation 8 and Equation 9 respectively). However, PCs, of STA value obtained by the above simulation does not necessarily have only two function values $PCs_{i,1}$ and $PCS_{i,2}$, there may be multiple function values due to effect of burrs. In the example principal component analysis herein, the function value with small effect is replaced with 0 to smooth the STA value obtained by the above simulation, thereby the actual result of STA may be almost perfectly restored. The principal component analysis method used herein is only an example, those skilled in the art may also use other methods to smooth the STA value to eliminate the effect of burrs.

The above describes the method of obtaining the STA 3D model shown in FIG. 15 by the WiFi system and based on the principal component analysis method. However, the preset model may also be obtained by other systems besides the WiFi system. In addition, the relationship between C1, C2 and STA may also be obtained from the measured data of the network, to forming a formulaic mapping relationship.

As an example, according to the STA 3D model of shown in FIG. 15, possible candidate combinations of C1 and C2 is selected from the 3D curve based on the probability of the unlicensed band being historically unavailable (historical STA) and the prediction result of the availability of the unlicensed band (predicted STA). That is, in the STA 3D model, the historical STA corresponds to a curve depicted by C1 and C2, and the predicted STA corresponds to another curve depicted by C1 and C2. According to the two curves, multiple candidate combinations of C1 and C2 may be determined, for example:

C1 (2 UE) & C2 sequence (traffic load [%]): [60%, 57%, 80%, 50%, 40%];

C1 (4 UE) & C2 sequence (traffic load [%]): [40%, 35%, 58%, 25%, 10%].

The state of the WiFi system will affect the success transmission probability of the data packets. Based on the WiFi transmission mechanism, the period of one WiFi transmission lasts about 300 ms. Since the resource occupation period of WiFi is long enough compared with the scheduling period of NR-U, it may be assumed that the number of WiFi users is stable during the scheduling period of NR-U. Therefore, the number of WiFi users is stable with large probability during obtaining the historical STA (also called the current STA or the previous STA) and obtaining the predicted STA. Therefore, based on the above 3D model, with the change of STA, the reliability of the unlicensed band with the minimum variance/fluctuation of the number of WiFi users is relatively higher. Therefore, the above 3D model may be used to select the combination of C1 and C2 with the minimum change amplitude of C1 in the historical STA and the predicted STA intervals.

That is, a combination of C1 and C2 with the minimum fluctuation of C1 may be selected from among the above multiple candidate combinations. C1 with the minimum fluctuation of C1 refers to C1 that C1 corresponding to the predicted STA has the minimum change with respect to C1 corresponding to the historical STA, among the multiple candidate combinations. It is equivalent to assuming that C1 is constant in a certain period (e.g., the period of WiFi transmission). In addition, when C1 and C2 are predicted at a next time, STA at this time and the obtained C1 and C2 corresponding to the STA may be used as the historical STA at the next time and C1 and C2 corresponding to the historical STA respectively.

The traffic load may represent the occupying ratio of the traffic data transmission time. For example, the unlicensed band may continuously transmit data packets every 10 ms, and a group of data packets is transmitted on the unlicensed band for 3 ms, which occupies 30% time resources of the unlicensed band.

In addition, at operation 1403, the STP value (e.g., it may also be the adjusted or modified STP value) of the unlicensed band may be obtained based on the preset mapping relationship between STA and STP.

It should be understood that the order in which the operations of obtaining C1 and C2 values and obtaining STP values are performed is not limited to the order shown in FIG. 14. For example, the operations in the two dashed boxes in FIG. 14 (operations 1401 and 1402 in one dashed box, and operation 1403 in another dashed box) is performed in parallel, or operation 1403 is performed first, then operations 1401 and 1402 are performed.

As shown in FIG. 14, after obtaining the STP value and the selected C1 and C2 values, when the following preset condition are met ("yes" at operation 1404), at operation 1405, it may be determined that the data packets are retransmitted on the unlicensed band (on Scell): the STP value of the unlicensed band is not less than a third preset threshold for the unlicensed band and Xsta (i.e., the selected C1 value) is not greater than a fourth preset threshold for the unlicensed band.

Alternatively, the above preset condition may also be set as follows: the STP value of the unlicensed band is not less than the third preset threshold for the unlicensed band and the selected C2 value is not greater than a fifth preset threshold for the unlicensed band. Alternatively, the above condition may also be set as follows: the STP value of the unlicensed band is not less than the third preset threshold for the unlicensed band, the selected C1 value is not greater than the fourth preset threshold for the unlicensed band, and the selected C2 value is not greater than the fifth preset threshold for the unlicensed band. That is, the fewer the users using the unlicensed band, the lower the traffic load, and simultaneously the higher the STP, which mean the higher the reliability of carriers/sub-bands of the band.

When all unlicensed bands including the unlicensed band do not meet the preset condition ("No" at operation 1404), at operation 1406, the network node may determine to retransmit the data packets on the licensed band.

When there are at least two unlicensed bands meeting the preset condition, the network node may determine to retransmit the data packets on at least one of the at least two unlicensed bands based on the number of the data packets.

When the number of the data packets is not greater than a predetermined number, the network node may select an unlicensed band to retransmit the data packets from among the at least two unlicensed bands, based on at least one of the STP, C1 and C2 values of the at least two unlicensed bands. In addition, when the number of data packets is not less than the predetermined number, the network node may also determine the number of data packets capable of being allocated to the at least two unlicensed bands based on the STP values of the at least two unlicensed bands, and retransmit the data packets by using the at least two unlicensed bands according to the determined number respectively.

However, according to an embodiment of the disclosure, when the number of the data packets is greater than the predetermined number, it is not necessary to retransmit the data packets using the at least two unlicensed bands. Regardless of the number of the data packets, only one unlicensed band meeting the preset condition may be selected for retransmission.

Figure 16:
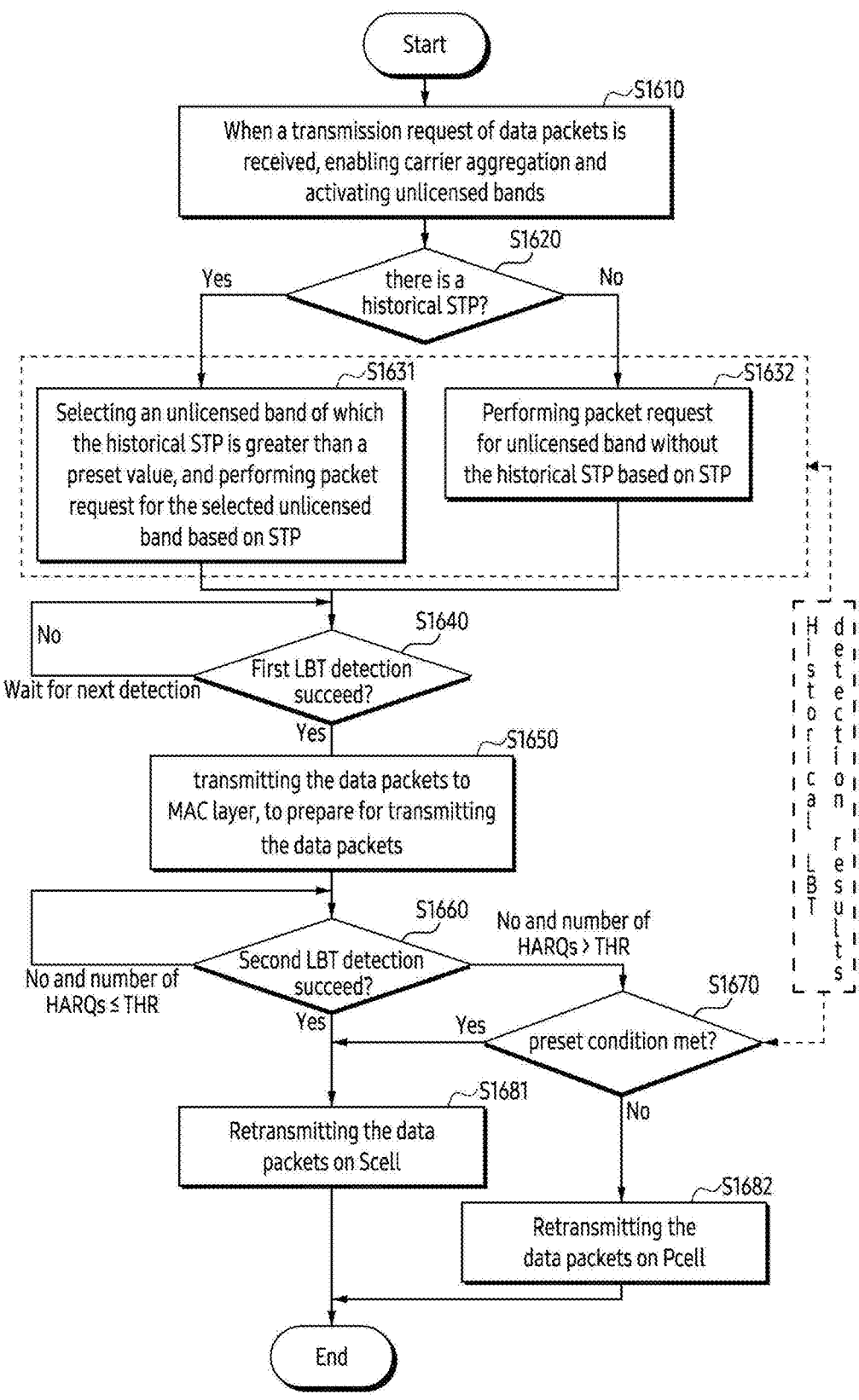
FIG. 16 is a flowchart illustrating data communication where a communication method using unlicensed bands is applied according to an embodiment of the disclosure.

FIG. 16 is a flowchart illustrating data communication where a communication method using unlicensed bands is applied according to an embodiment of the disclosure. Hereinafter, the operations are described as being performed by the network node. For example, the network node comprises the base station. Also, for example, the network node comprises the DU of the base station. Also, for example, the network node comprises the RU of the base station.

Referring to FIG. 16, at operation S1610, when the transmission request of the data packets is received, the network node may enable carrier aggregation and activate unlicensed bands. At operation S1620, the network node may determine whether there is a historical STP for each unlicensed band. When there is a historical STP ("Yes" at operation S1620), at operation S1631, the network node may select an unlicensed band of which the historical STP is not less than a preset value, and perform packet request based on the STP for the selected unlicensed band. When there is no historical STP ("No" at operation S1620), at operation S1632, the network node may perform packet request based on the STP for the unlicensed band without the historical STP.

As an example, herein, STP may be calculated based on the result of the Listen Before Talk (LBT) detection technology, but not limited thereto, for example, other technologies that may determine the availability of unlicensed bands may also be used. That is, at operations S1631 and S1632, the network node may obtain the prediction result of LBT detection based on the historical LBT detection result (e.g., which may also be the historical LBT detection result modified based on the historical feedback data of HARQ), and calculate the STP value based on the prediction result, and modify the STP based on available band resources (e.g., the first available resource factor described above), and transmit the data packets based on the modified STP value.

When the transmission request of the data packets is an initial transmission request of the data packets, the network node may determine the number of data packets capable of being allocated to each unlicensed band based on the modified STP. When the number of data packets capable of being allocated to each unlicensed band is determined, at operation S1640, the network node may perform LBT detection for each unlicensed band. When the LBT detection on the unlicensed band is successful (the unlicensed band is available) ("Yes" at operation S1640), at operation S1650, the network node may allocate the corresponding determined number of data packets to the unlicensed band, and then transmit the data packets to the MAC layer, and then encode and modulate to prepare for transmitting the data packets. At operation S1660, the LBT detection on the unlicensed band may be performed again before NR transmission, when the LBT detection performed again on the unlicensed band is successful ("Yes" at operation S1660), at operation S1681, the network node may transmit the data packets on the unlicensed band. In addition, when the LBT detection on the unlicensed band does not pass ("No" at operation S1640), it may wait for a next LBT detection. When the LBT detection performed again on the unlicensed band fails before NR transmission ("No" at operation S1660) and the number of HARQs is less than or equal to the preset threshold number THR, it may return to operation S1660, and perform LBT detection again.

When the RLC timer expires, or when the second LBT detection on the unlicensed band does not pass ("No" at operation S1660) and the number of HARQs is greater than the preset threshold number THR, or when the transmission request of the data packets is the retransmission request, at operation S1670, the network node may determine whether the preset condition is met or not. The network node may select bands for retransmission. According to an embodiment of the disclosure, the network node may select the bands for retransmission according to the STP value (e.g., the modified STP value). According to an embodiment of the disclosure, the bands for retransmission may be selected according to STP value and at least one of C1 and C2 values. The operations of obtaining STP values and C1 and C2 values have been described in detail above with reference to FIGS. 7 to 10 and FIGS. 14 and 15 respectively, thus it will not be repeated here.

In case that the preset condition is met, the network node may perform the operation S1681. In case that the preset condition is not met, the network node may perform the operation S1682.

For example, when the STP value of the unlicensed band meet and at least one of the C1 and C2 values of the unlicensed band meet the preset condition, at operation S1681, the network node may retransmit the data packets on the Scell. For example, when all unlicensed bands do not meet the preset condition, at operation S1682, the network node may retransmit the data packets on Pcell.

When there are at least two unlicensed bands meeting the preset condition, it may be determined to retransmit the data packets on at least one of the at least two unlicensed bands based on the number of the data packets. When the number of the data packets is not greater than a predetermined number, one unlicensed band may be selected to retransmit the data packets from among the at least two unlicensed bands, based on at least one of the STP, C1 and C2 values of the at least two unlicensed bands. When the number of the data packets is greater than the predetermined number, the number of data packets capable of being allocated to the at least two unlicensed bands may be determined based on the STP values of the at least two unlicensed bands, and the data packets may be retransmitted by using the at least two unlicensed bands according to the determined number respectively.

The initial transmission process and retransmission process of the data communication flow shown in FIG. 16 both use the communication method based on STP (the method of allocating data packets to unlicensed bands based on STP and the method of selecting bands for retransmission based on STP) according to the embodiment of the disclosure. However, this is only an example, and the initial transmission method and the retransmission method using unlicensed bands according to the embodiment of the disclosure may be used separately. For example, the initial transmission process of data communication may use the method of allocating data packets based on STP according to the embodiment of the disclosure, while the retransmission process may use the traditional retransmission method (retransmitting by using licensed bands). For another example, the initial transmission process of data communication may use the traditional initial transmission method, but the retransmission process may use the method of selecting bands for retransmission base on STP according to the embodiment of the disclosure.

Figure 17:
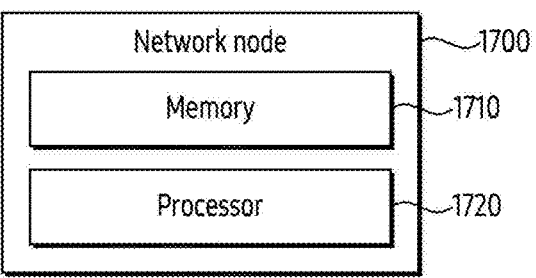
FIG. 17 is a schematic block diagram illustrating a network node according to an embodiment of the disclosure.

FIG. 17 is a schematic block diagram illustrating a network node according to an embodiment of the disclosure.

Referring to FIG. 17, the network node 1700 may include at least one memory 1710 storing computer executable instructions and at least one processor 1720, wherein the computer executable instructions, when executed by the at least one processor 1720, cause the at least one processor 1720 to perform the above method performed by the network node 1700.

The above method performed by the network node 1700 has been described with reference to FIGS. 5 to 15, and it will not be repeated here.

As an example, the network node 1700 may be a base station, a relay equipment, a user apparatus, or other device capable of performing the above instructions. The network node 1700 does not have to be a single apparatus, but may also be any combination of devices or circuits that can independently or jointly perform the above instructions (or instruction sets). The network node 1700 may also be part of an integrated control system or a system manager.

In network node 1700, the at least one processor 1720 may include a central processing unit (CPU), a graphics processor (GPU), a programmable logic device, a dedicated processor system, a microcontroller, or a microprocessor. By way of example but not limitation, the at least one processor 1720 may also include an analogy processor, a digital processor, a microprocessor, a multi-core processor, a processor array, a network processor, and the like.

The at least one processor 1720 may run instructions or codes stored in the at least one memory 1710, which may also store data. Instructions and data may also be transmitted and received by a network via a network interface device, which may use any known transmission protocol.

The at least one memory 1710 may be integrated with the at least one processor 1720, for example, random access memory (RAM) or flash memory may be arranged within an integrated circuit microprocessor or the like. In addition, the at least one memory 1710 may include independent devices, such as an external disk drive, a storage array, or other storage device that may be used by any database system. The at least one memory 1710 and the at least one processor 1720 may be operatively coupled, or may communicate with each other, for example, via I/O ports, network connections, etc., so that the at least one processor 1720 may read files stored in the at least one memory 1710.

In addition, all components of the network node 1700 may be connected to each other via a bus and/or a network.

Figure 18:
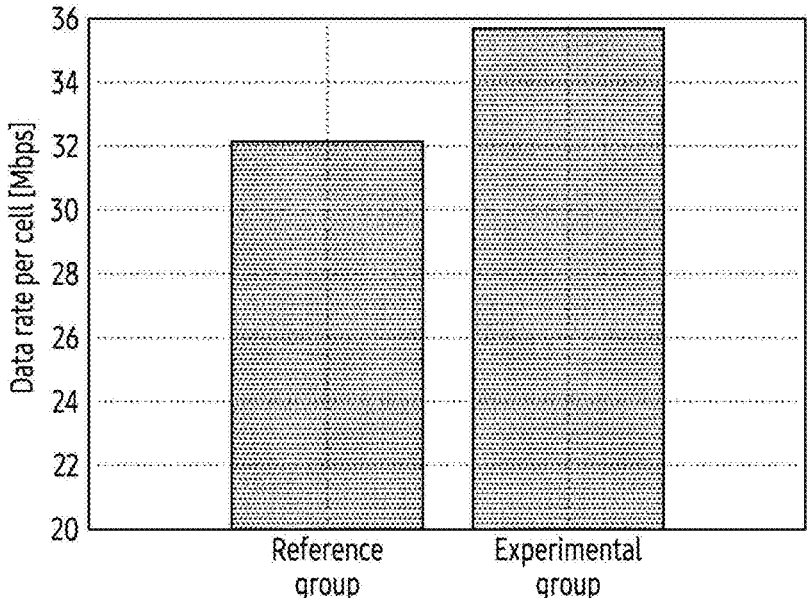
FIG. 18 is a diagram illustrating a first effect of applying a method using unlicensed bands according to an embodiment of the disclosure.

FIG. 18 is a diagram illustrating a first effect of applying the method using unlicensed bands according to an embodiment of the disclosure.

As a reference group, a single cell with 30 UEs may be used. All UEs use two carriers (a primary cell and a secondary cell). The primary cell is a licensed band carrier, and the secondary cell is an unlicensed band carrier; the secondary cell carrier is a carrier with a bandwidth of 80 MHz and a working band of 5 GHz. 10% UE of all UEs use large packet traffic (data packet arrival size is 1500 kbit, an average of data packet arrival intervals is 4000 transmission time interval (TTI)), and 90% of UEs use small packet traffic (data packet arrival size is 50 kbit, an average of data packet arrival intervals is 100 TTI). All UEs communicate by using the carrier aggregation technology.

As an experimental group using the method of the disclosure, the traffic configuration of the experimental group is the same as that of the reference group. The difference is that: the unlicensed band carriers of the experimental group are composed of 8 carriers with a bandwidth of 20 MHz; the method performed by the network node 1700 according to the embodiment of the disclosure is applied to allocate the data packets.

Referring to FIG. 18, the transmission rate of the experimental group increases by about 11% compared to the transmission rate of the reference group.

Figure 19:
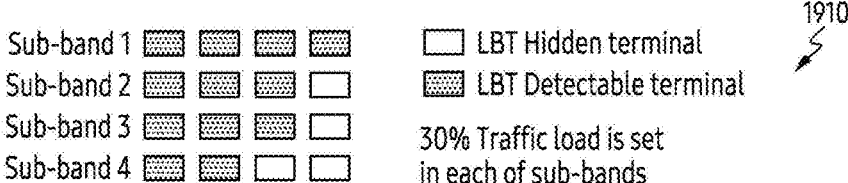
FIG. 19 is a diagram illustrating a second effect of applying a method using unlicensed bands according to an embodiment of the disclosure.
Figure 19:
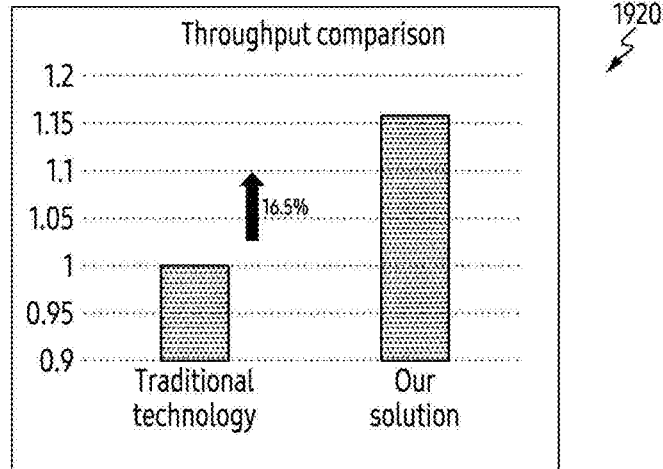
Figure 19:
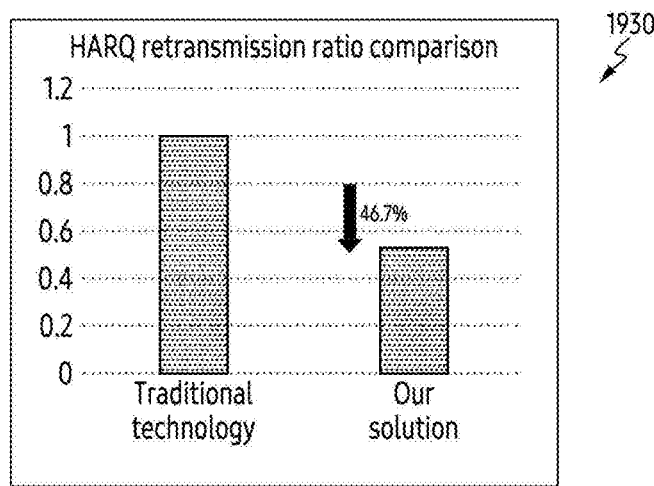

FIG. 19 is a diagram illustrating a second effect of applying a method using unlicensed bands according to an embodiment of the disclosure.

In order to compare the throughput and HARQ retransmission ratio, referring to part 1910 of FIG. 19, the following evaluation settings may be made: it may be set that a single NR-U UE accesses the network, and the UE uses the FULL buffer traffic model, forms a channel maximum time domain occupancy ratio (MCOT) of (7+6/7)/10. The total bandwidth of the NR-U band is 80 MHz, including four sub-bands with a bandwidth of 20 MHz. In addition, WiFi users in different states using the same band are configured. Because, for WiFi users, LBT detection can detect signals with strength greater than-62 dBm, the ratio of hidden terminals at the cell edge generally does not exceed 50%. In the test, 50% of UEs on sub-band 4 are hidden terminals, 25% of UEs on sub-band 2 and sub-band 3 are hidden terminals, and there is no hidden terminal in sub-band 1. In addition, 30% of the traffic load is set in each sub-band.

According to the above settings, the solution of transmitting data packets using unlicensed bands according to the embodiment of the disclosure (i.e., using the modified historical data to predict the availability of bands, and allocating data packets based on the modified STP) and the traditional technology may be used to obtain the comparison results of the throughput and HARQ retransmission ratio of the two.

The graph 1920 indicates throughput. Referring to the graph 1920 of FIG. 19, the solution of the disclosure may bring 16.5% throughput gain, compared to the traditional technology. The graph 1930 indicates HARQ retransmission ratio. Referring to the graph 1930 of FIG. 19, the solution of the disclosure may reduce 46.7% HARQ retransmission, compared to the traditional technology.

Figure 20:
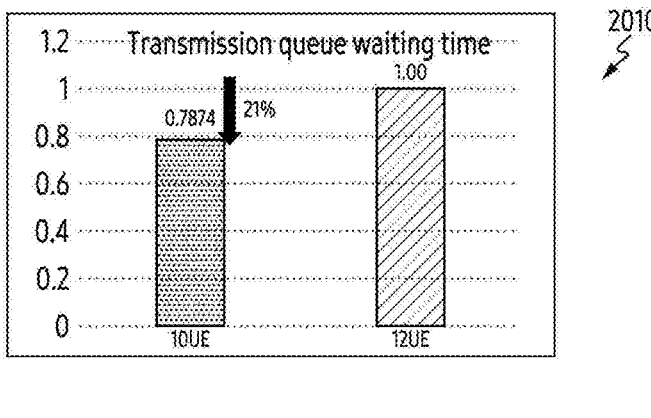
FIG. 20 is a diagram illustrating a third effect of applying a method using unlicensed bands according to an embodiment of the disclosure.
Figure 20:
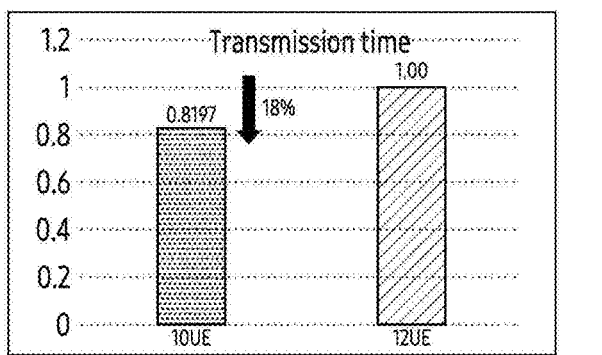
Figure 20:
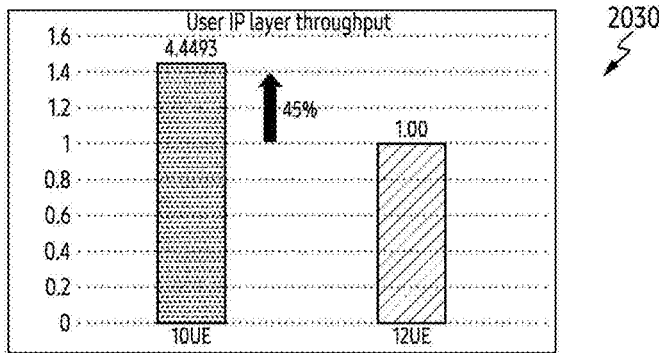
Figure 20:
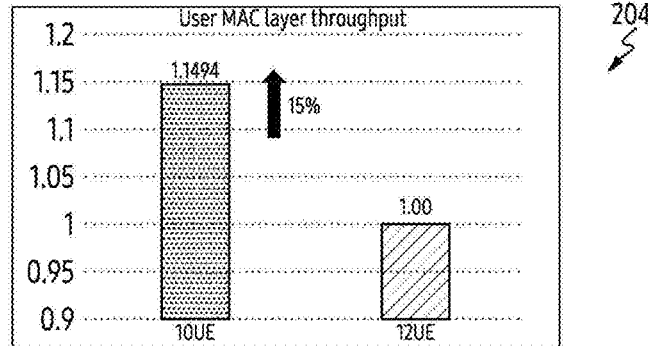

FIG. 20 is a diagram illustrating a third effect of applying the method using unlicensed bands according to an embodiment of the disclosure.

In order to compare the impact on other UEs on the primary cell of the licensed band, the following evaluation settings may be made: 12 NR-U UEs may be set for ARQ retransmission, all using the FULL buffer traffic model, and the bandwidth of the primary cell is 20 MHz.

By using the traditional technology, it is monitored that 12 NR-U UEs perform ARQ retransmissions in the primary cell, and 12 UEs will occupy all resources of the gNB. Under the same traffic model, by using the solution of the disclosure, it is monitored that 10 NR-U UE perform ARQ retransmission in the primary cell.

Referring to FIG. 20, the graph 2010 indicates transmission queue wating time per communication scheme (e.g., the traditional technology and the solution of the disclosure). Referring to the graph 2010, according to the solution of the disclosure, the transmission waiting time duration of the licensed band decreases. The graph 2020 indicates transmission time per communication scheme (e.g., the traditional technology and the solution of the disclosure). Referring to the graph 2020, according to the solution of the disclosure, transmission time duration of the licensed band decreases.

The graph 2030 indicates IP layer throughput per communication scheme (e.g., the traditional technology and the solution of the disclosure). Referring to the graph 2030, according to the solution of the disclosure, the IP layer throughput of the licensed band is improved. The graph 2040 indicates MAC layer throughput per communication scheme (e.g., the traditional technology and the solution of the disclosure). Referring to the graph 2040, according to the solution of the disclosure, the MAC layer throughput of the licensed band is improved. Because the ARQ retransmission data packets of some UEs are no longer transmitted on the licensed band, the congestion level of the licensed band is reduced.

According to the various embodiments of the disclosure, highly reliable unlicensed carriers/sub-bands are selected for data transmission of the wireless mobile network, based on the historical availability data of unlicensed bands (such as historical LBT results) and the historical feedback data of HARQ, compared with the existing solutions, which has a higher success transmission probability, and the success ratios of initial transmission and retransmission can be improved, and finally the overall throughput of the system can be improved. On the one hand, by modifying the historical availability data based on the historical feedback data of HARQ, the evaluation of the second availability detection results of all unlicensed carriers may be taken into account, which reduces the impact of the inconsistency of the two availability detection results, and may avoid the problem that a subsequent carrier misses the LBT detection caused by that a previous carrier/sub-band passes the LBT detection and the subsequent carrier/sub-band skips the LBT detection in the existing solution. On the other hand, the number of ACKs/NACKs fed back by historical HARQ can reflect whether there are hidden terminals. Therefore, using HARQ feedback results to modify the historical availability results may enhance the accuracy of the evaluation of the second availability detection result and reduce the impact of hidden terminals.

According to the various embodiments of the disclosure, during the initial transmission of data packets, STP is calculated according to the preset mapping relationship between STA and STP based on the prediction result (STA) of the availability of the unlicensed band, and two STP threshold values are set for STP, three STP intervals are divided, and different numbers of data packets are allocated for different STP intervals, compared with the prior art which only considers that each unlicensed band is available last time (e.g., LBT success) and then does not limit the number of data packets to use the unlicensed band for transmission, the disclosure reasonably allocates the corresponding number of data packets that may be transmitted, according to the probability of each unlicensed band being available recently, the implementation of the disclosure is conducive to avoiding the problem of transmission failure of a large number of data packets allocated in the unlicensed band for transmitting data packets caused by this band being unavailable frequently. Therefore, allocating data packets based on the availability of each unlicensed band is implemented, the risk of data packet transmission failure is reduced, the efficiency of data transmission is improved, and the delay is shortened.

Through the above initial transmission process, the transmission failure probability of the unlicensed band carriers/sub-bands may be controlled at a low level, but transmission failure may still occur in some cases. In order to further enhance retransmission, the carriers/sub-bands of the unlicensed band may be selected for ARQ retransmission. As a result, UEs on the licensed band will have more transmission opportunities, and the throughput of the corresponding users will be improved, thereby increasing the overall capacity of the system.

According to an embodiment of the disclosure, in the retransmission process of data packets, the availability of carriers/sub-bands of each unlicensed band may be predicted by using the same method as that of the initial transmission process, the unlicensed carriers/sub-bands are selected for ARQ retransmission, based on the STP value and the state information (C1 and C2 described above) of the co-frequency system, and carriers/sub-bands of the unlicensed band with STP value is higher than a specific threshold may be selected, which may reduce the pressure of the primary carrier using the licensed bands for data transmission. In addition, the combination of C1 and C2 with the minimum variance of C1 in the co-frequency system may be selected according to the preset STA 3D model, and by further considering C1 and C2 in the co-frequency system, the unlicensed band with higher availability can be selected for retransmission of data packets. This solves the problem that the primary carrier is overloaded, the transmission rate of other users served by the primary carrier decreases significantly, caused by that all the data packets to be retransmitted must be transmitted on the primary carrier of the licensed band in the prior art, while this reduces the probability of data to be retransmitted being retransmitted again. The disclosure reasonably allocates the data packets to be retransmitted to the highly reliable and available unlicensed band, which is conducive to improving the retransmission efficiency of traffic data.

The network node may be implemented by artificial intelligence (AI) model. The functions associated with A1 may be performed by a nonvolatile memory, a volatile memory and a processor.

The processor may include one or more processors. At this time, the one or more processors may be general-purpose processors, for example, a central processing unit (CPU), an application processor (AP), etc., and a processor only for graphics (e.g., graphics processor unit (GPU), Visual Processing Unit (VPU), and/or AI dedicated processors (e.g., neural processing unit (NPU)).

The one or more processors control the processing of input data according to a predefined operating rule or artificial intelligence (AI) model stored in nonvolatile memory and volatile memory. The predefined operating rules or artificial intelligence model may be provided by training or learning. Here, the provided by learning means that the predefined operating rules or AI model with desired characteristics are formed by applying the learning algorithm to a plurality of learning data. The learning may be performed in the apparatus itself performing AI according to the embodiment, and/or may be implemented by a separate server/apparatus/system.

As an example, the artificial intelligence model may be composed of multiple neural network layers. Each layer has multiple weight values, and the layer operation is performed through the calculation of the previous layer and the operation of multiple weight values. Examples of neural networks include but are not limited to Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), Generative Adversarial Network (GAN) and Deep Q-Leaning Network.

A learning algorithm is a method of using a plurality of learning data to train a predetermined target apparatus (e.g., a robot) to make, allow or control the target apparatus to make a determination or prediction. Examples of the learning algorithm include but are not limited to supervised learning, unsupervised learning, semi supervised learning or reinforcement learning.

A computer-readable storage medium storing computer programs thereon may be provided, wherein the programs, when executed, implement the method performed by the network node 1700 according to the embodiment of the disclosure. Examples of computer-readable storage media herein include: a read-only memory (ROM), a random access programmable read-only memory (PROM), an electrically erasable programmable read-only memory (EEPROM), a random access memory (RAM), a dynamic random access memory (DRAM), a static random access memory (SRAM), a flash memory, a non-volatile memory, compact disc (CD)-ROM, CD-R, CD+R, CD-RW, CD+RW, digital versatile disc (DVD)-ROM, DVD-R, DVD+R, DVD-RW, DVD+RW, DVD-RAM, Blu-ray disc (BD)-ROM, BD-R, BD recordable low to high (BD-R LTH), BD recordable erasable (BD-RE), Blu ray or optical disk memory, hard disk driver (HDD), solid state disk (SSD), card type memory (such as multimedia card, security digital (SD) card or extreme digital (XD) card), tape, floppy disk, magneto-optical data storage device, optical data storage device, hard disk, solid state disk and any other device configured to store computer programs and any associated data, data files and data structures in a non-temporary manner and provide the computer programs and any associated data, data files and data structures to the processor or the computer so that the processor or the computer can execute the computer programs. The computer programs in the computer-readable storage medium described above may run in an environment deployed in a computer apparatus such as a terminal, client, host, agent device, server, base station etc. In addition, in one example, the computer programs and any associated data, data files, and data structures are distributed on a networked computer system, so that the computer programs and any associated data, data files, and data structures are stored, accessed, and executed in a distributed manner by one or more processors or computers.

After considering the description and practicing the disclosure disclosed herein, those skilled in the art will easily conceive of other embodiments of the disclosure. The disclosure is intended to cover any variant, use or adaptive change of the disclosure, the variant, use or adaptive change follows general principles of the disclosure and includes the common general knowledge or commonly used technical means in the technical field which is not disclosed in the disclosure. The real scope and spirit of the disclosure are pointed out in claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a network node, the method comprising:

obtaining prediction information indicating a probability of an unlicensed band being unavailable based on historical data including results of listen before talk (LBT) detection on the unlicensed band:

selecting transmission resources of the unlicensed band based on the prediction information:

determining a number of data packets capable of being allocated to the transmission resources based on the prediction information; and transmitting the data packets on the transmission resources according to the determined number of data packets capable of being allocated to the transmission resources, wherein the number of data packets is determined based on a success transmission probability (STP) value corresponding to the probability of the unlicensed band being unavailable.

2. The method of claim 1, wherein the STP value is determined based on a preset mapping relationship between the probability of the unlicensed band being unavailable and a corresponding STP.

3. The method of claim 2, wherein the STP value is determined based on a first available resource factor, and wherein the first available resource factor is related to a number of users that transmit data on the unlicensed band.

4. The method of claim 2, wherein, in a case that the STP value is not greater than a first threshold value, the number of data packets is determined to be a first number, wherein, in a case that the STP value is greater than the first threshold value and not greater than a second threshold value, the number of data packets is determined to be a second number, wherein, in a case that the STP value is greater than the second threshold value, the number of data packets is determined to be a third number, wherein the first number corresponds to a fixed value, wherein the second number is positively correlated to the STP value, and wherein the third number is a packet request number determined based on a transmission capacity of a licensed band.

5. The method of claim 2, further comprising:

determining whether to retransmit the data packets on the unlicensed band based on the STP value.

6. The method of claim 2, wherein the determining of whether to retransmit the data packets on the unlicensed band based on the STP value comprises:

based on identifying that the STP value is greater than a second preset threshold for the unlicensed band, determining to retransmit the data packets on the unlicensed band.

7. The method of claim 5, wherein the determining of whether to retransmit the data packets on the unlicensed band based on the STP value comprises:

determining a number C1 of users using at least one of the unlicensed band or a traffic load C2 of the unlicensed band based on a probability of the unlicensed band being historically unavailable and a prediction result; and determining whether to retransmit the data packets on the unlicensed band based on at least one of a C1 value or a C2 value, and the STP value.

8. The method of claim 7, wherein the determining of the number C1 of the users using at least one of the unlicensed band or the traffic load C2 of the unlicensed band comprises:

determining candidate combinations of the number of users using the unlicensed band and the traffic load of the unlicensed band based on the probability of the unlicensed band being historically unavailable and the prediction result; and selecting a candidate combination with a minimum variance of the number of users from among the candidate combinations, and obtaining at least one of the C1 value or the C2 value based on the selected candidate combination.

9. The method of claim 5, further comprising:

based on identifying that all unlicensed bands including the unlicensed band do not meet a preset condition, determining to retransmit the data packets on a licensed band.

10. The method of claim 1, wherein the historical data of the unlicensed band comprises historical availability data of the unlicensed band and historical feedback data of hybrid automatic retransmission quest (HARQ) for the unlicensed band, and wherein, in a case that historical feedback data for a specific time among the historical feedback data is negative acknowledgement (NACK), the historical availability data of the unlicensed band for the specific time is modified.

11. The method of claim 10, wherein the historical data of the unlicensed band includes historical success transmission probability (STP) value for the unlicensed band, and wherein the prediction information is obtained in response to the historical STP value for the unlicensed band exceeding a first preset threshold.

12. A network node, comprising:

at least one processor; and at least one memory for storing computer executable instructions, wherein the computer executable instructions, when executed by the at least one processor, cause the at least one processor to:

obtain prediction information indicating a probability of an unlicensed band being unavailable based on historical data including results of listen before talk (LBT) detection on the unlicensed band, select transmission resources of the unlicensed band based on the prediction information, determine a number of data packets capable of being allocated to the transmission resources based on the prediction information, and transmit the data packets on the transmission resources according to the determined number of data packets capable of being allocated to the transmission resources, and wherein the number of data packets is determined based on a success transmission probability (STP) value corresponding to the probability of the unlicensed band being unavailable.

13. The network node of claim 12, wherein the STP value is determined based on a first available resource factor, and wherein the first available resource factor is related to a number of users that transmit data on the unlicensed band.

14. The network node of claim 12, wherein the computer executable instructions, when executed by the at least one processor, cause the at least one processor to:

based on identifying that all unlicensed bands including the unlicensed band do not meet a preset condition, determine to retransmit the data packets on a licensed band.

15. The network node of claim 12, wherein the computer executable instructions, when executed by the at least one processor, cause the at least one processor to:

determine a number C1 of users using at least one of the unlicensed band or a traffic load C2 of the unlicensed band based on a probability of the unlicensed band being historically unavailable and a prediction result, and determine whether to retransmit the data packets on the unlicensed band based on at least one of a C1 value or a C2 value, and the STP value.

16. The network node of claim 12, wherein, in a case that the STP value is not greater than a first threshold value, the number of data packets is determined to be a first number, wherein, in a case that the STP value is greater than the first threshold value and not greater than a second threshold value, the number of data packets is determined to be a second number, wherein, in a case that the STP value is greater than the second threshold value, the number of data packets is determined to be a third number, wherein the first number corresponds to a fixed value, wherein the second number is positively correlated to the STP value, and wherein the third number is a packet request number determined based on a transmission capacity of a licensed band.

17. A non-transitory computer readable storage medium storing computer program instructions thereon, wherein the computer program instructions, when executed by a processor of a network node, cause the network node to perform operations, the operations comprising:

obtaining prediction information indicating a probability of an unlicensed band being unavailable based on historical data results of listen before talk (LBT) detection on the unlicensed band;

selecting transmission resources of the unlicensed band based on the prediction information;

determining a number of data packets capable of being allocated to the transmission resources based on the prediction information; and transmitting the data packets on the transmission resources according to the determined number of data packets capable of being allocated to the transmission resources, wherein the number of data packets is determined based on a success transmission probability (STP) value corresponding to the probability of the unlicensed band being unavailable.

\* \* \* \* \*